United States Patent
Ushiyama et al.

(10) Patent No.: US 10,513,577 B2
(45) Date of Patent: Dec. 24, 2019

(54) EPOXY RESIN COMPOSITION, MOLDED ARTICLE, PREPREG, FIBER-REINFORCED COMPOSITE MATERIAL AND STRUCTURE

(71) Applicant: Mitsubishi Chemical Corporation, Chiyoda-ku (JP)

(72) Inventors: Hisaya Ushiyama, Tokyo (JP); Kenichi Watanabe, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/576,007

(22) PCT Filed: Jun. 9, 2016

(86) PCT No.: PCT/JP2016/067229
§ 371 (c)(1),
(2) Date: Nov. 21, 2017

(87) PCT Pub. No.: WO2016/199857
PCT Pub. Date: Dec. 15, 2016

(65) Prior Publication Data
US 2018/0155489 A1    Jun. 7, 2018

(30) Foreign Application Priority Data

Jun. 11, 2015   (JP) ................. 2015-118446
Feb. 23, 2016   (JP) ................. 2016-032250

(51) Int. Cl.
*C08G 59/22*    (2006.01)
*C08J 5/24*     (2006.01)
(Continued)

(52) U.S. Cl.
CPC ....... *C08G 59/226* (2013.01); *C08G 59/4021* (2013.01); *C08G 59/5033* (2013.01);
(Continued)

(58) Field of Classification Search
CPC .............. C08G 59/226; C08G 59/4021; C08G 59/5033; C08G 59/5073; C08G 59/56;
(Continued)

(56) References Cited

U.S. PATENT DOCUMENTS

2004/0034127 A1    2/2004   Taguchi et al.
2006/0035088 A1*   2/2006   Takano ................. C08G 59/18
                                                              428/413
(Continued)

FOREIGN PATENT DOCUMENTS

JP    2004-131636      4/2004
JP    2006-28298 A     2/2006
(Continued)

OTHER PUBLICATIONS

Ichemistry.cn: Cureszol 2E4MZ-Azine. Retrieved on Mar. 20, 2018. http://www.ichemistry.cn/cas/CUREZOL+2E4MZ.2DAzine.*

(Continued)

*Primary Examiner* — David T Karst
(74) *Attorney, Agent, or Firm* — Oblon, McClelland, Maier & Neustadt, L.L.P.

(57) ABSTRACT

An epoxy resin composition includes an organic phosphinic acid metal salt; an epoxy resin; dicyandiamide or a derivative thereof; a curing accelerator having a dimethylureido group; and an imidazole-based curing accelerator having a curing initiation temperature of 100° C. or higher. The curing initiation temperature is measured by a method includes preparing a sample resin composition by adding 10 parts by mass of an imidazole-based curing accelerator to 100 parts by mass of a bisphenol A type epoxy resin having an epoxy equivalent of 180 to 220, and mixing the components; measuring a calorific value of the sample resin composition using a differential scanning calorimeter at a rate of temperature increase of 10° C./min, and designating (Continued)

a temperature at the intersection point of the tangent line at the inflection point of the DSC curve thus obtained and the baseline as the curing initiation temperature.

15 Claims, 1 Drawing Sheet

(51) Int. Cl.

| | |
|---|---|
| *C08G 59/68* | (2006.01) |
| *C08G 59/40* | (2006.01) |
| *C08G 59/50* | (2006.01) |
| *C08G 59/56* | (2006.01) |
| *C08K 5/5313* | (2006.01) |
| *C08L 63/00* | (2006.01) |
| *C08K 5/00* | (2006.01) |

(52) U.S. Cl.
CPC ......... *C08G 59/5073* (2013.01); *C08G 59/56* (2013.01); *C08G 59/68* (2013.01); *C08J 5/24* (2013.01); *C08K 5/5313* (2013.01); *C08L 63/00* (2013.01); *C08J 2363/00* (2013.01); *C08L 2201/02* (2013.01)

(58) Field of Classification Search
CPC ......... C08G 59/68; C08J 5/24; C08J 2363/00; C08K 5/5313; C08L 63/00; C08L 2201/02
USPC ........................................................ 523/400
See application file for complete search history.

(56) References Cited

U.S. PATENT DOCUMENTS

| | | | | |
|---|---|---|---|---|
| 2011/0319525 | A1* | 12/2011 | Maeda | ............... C08G 59/3218 523/452 |
| 2012/0028047 | A1* | 2/2012 | Imai | .......................... C08J 5/04 428/403 |
| 2012/0164373 | A1* | 6/2012 | Spencer | ............. C08G 59/1488 428/116 |
| 2016/0060429 | A1* | 3/2016 | Kitai | .................. C08G 59/4014 174/258 |

FOREIGN PATENT DOCUMENTS

| | | | |
|---|---|---|---|
| JP | 2007-106978 | A | 4/2007 |
| JP | 2008-525599 | A | 7/2008 |
| JP | 2009-280755 | A | 12/2009 |
| JP | 2009-292976 | A | 12/2009 |
| JP | 2011-52165 | A | 3/2011 |
| JP | 2011-148938 | A | 8/2011 |
| JP | 2012-229363 | A | 11/2012 |
| JP | 2012-241179 | A | 12/2012 |
| WO | 02/50153 | A1 | 6/2002 |
| WO | 2006/071820 | A1 | 7/2006 |
| WO | WO-2015064064 | A1 * | 5/2015 ............... C08K 5/49 |

OTHER PUBLICATIONS

Kawamoto et al., machine translation of JP 2011-148938, Aug. 4, 2011.*
Clariant, https://www.clariant.com/en/Solutions/Products/2014/03/18/16/31/Exolit-OP-1230?p=1, accessed Jul. 3, 2018 (Year: 2018).*
Office Action dated Jan. 16, 2018 in Japanese Patent Application No. 2017-105830 with English translation, 6 pages.
International Search Report dated Aug. 9, 2016 in PCT/JP2016/067229 filed Jun. 9, 2016.
Japanese Office Action dated Mar. 28, 2017 in JP 2016-543216 filed Dec. 15, 2016 (with English translation).
Extended European Search Report dated Jun. 22, 2018 in corresponding European Patent Application No. 16807563.8, 5 pages.

* cited by examiner

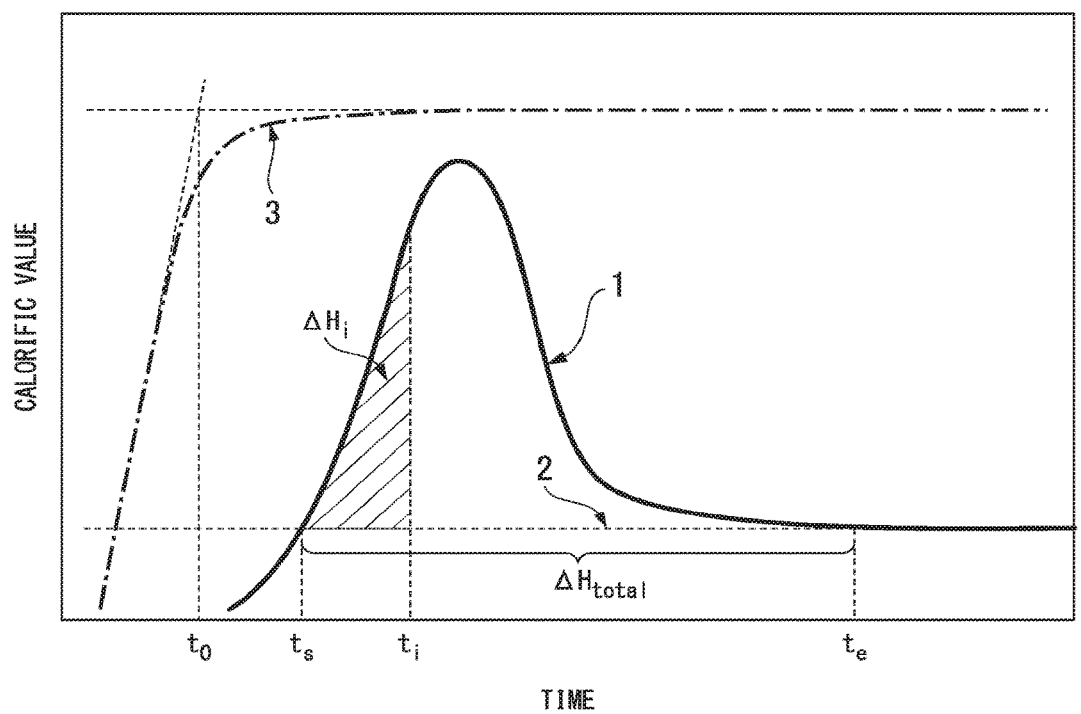

EPOXY RESIN COMPOSITION, MOLDED ARTICLE, PREPREG, FIBER-REINFORCED COMPOSITE MATERIAL AND STRUCTURE

TECHNICAL FIELD

The present invention relates to an epoxy resin composition, a molded article, a prepreg, a fiber-reinforced composite material, and a structure. More particularly, the invention relates to an epoxy resin composition for obtaining a fiber-reinforced composite material that is suitable for general industrial applications as well as aircraft material applications, and to uses thereof.

The present application claims priority to Japanese Patent Application No. 2015-118446 filed in Japan on Jun. 11, 2015, and Japanese Patent Application No. 2016-032250 filed in Japan on Feb. 23, 2016, the disclosures of which are incorporated herein.

BACKGROUND ART

Fiber-reinforced composite materials including a resin and reinforcing fibers in combination (FRP) have excellent lightweightness, rigidity, impact resistance and the like, and therefore, these materials are used in various applications. Particularly, carbon fiber-reinforced composite materials, which are lightweight and have high strength and high rigidity, are used in a large variety of fields such as sports/leisure applications such as fishing rods and golf shafts, automobile applications, and aircraft applications. Furthermore, in recent years, carbon fiber-reinforced composite materials are also used as housings for electronic/electric instruments such as laptop computers, by making advantages of the mechanical characteristics of carbon fiber-reinforced composite materials as well as electromagnetic wave shielding properties of carbon fibers.

Depending on the application, flame retardant performance is demanded for fiber-reinforced composite materials. For example, in a case in which fiber-reinforced composite materials are used for electronic/electric instruments, structural bodies for aircrafts and the like, since ignition caused by heat generation may cause a fire, flame retardant performance is required.

Regarding a method for making a fiber-reinforced composite material flame-retardant, methods of adding a brominated epoxy resin to a matrix resin composition have been widely used. However, in recent years, as a method for making a fiber-reinforced composite material flame-retardant in lieu of the addition of a brominated epoxy resin, an epoxy resin composition including a phosphorus-based flame retardant has come to be used, in consideration of the burden exerted on the human body or environment by the substances generated upon combustion of a resin composition including a halogen. Regarding an epoxy resin composition including a phosphorus-based flame retardant, for example, the epoxy resin compositions described in Patent Literatures 1 and 2 have been suggested. Furthermore, in regard to such flame-retardant epoxy resin compositions, for example, dicyandiamide and imidazole may be used in combination as curing agents (see Patent Literatures 1 to 3).

CITATION LIST

Patent Literature

Patent Literature 1: JP 2009-280755 A
Patent Literature 2: JP 2007-106978 A
Patent Literature 3: JP 2012-241179 A

SUMMARY OF THE INVENTION

Problem to be Solved by the Invention

However, the resin compositions of Patent Literatures 1 to 3 do not necessarily satisfy the requirement of thermal stability, and the resin compositions also have a problem of requiring high temperature and a long time period in order to be cured. Furthermore, a fiber-reinforced composite material obtainable using the resin composition of Patent Literature 3, does not necessarily satisfy the requirements of both flame retardancy and heat resistance.

The present invention was achieved in view of such circumstances, and it is an object of the invention to provide an epoxy resin composition having excellent curability and thermal stability; a prepreg; and a molded article, a fiber-reinforced composite material, and a structure, all of which have excellent flame retardancy and heat resistance and are obtainable using the epoxy resin composition or the prepreg.

Means for Solving Problem

The inventors of the present invention conducted a thorough investigation, and as a result, the inventors found that an epoxy resin composition having high flame retardancy and heat resistance and also having high curability is obtained by using a particular flame retardant, and using dicyandiamide or a derivative thereof as a curing agent and a compound having a dimethylureido group as a curing accelerator in combination, thus completing the present invention.

That is, the present invention includes the following embodiments.

[1] An epoxy resin composition comprising the following Component (A), Component (B), Component (C), and Component (D):
Component (A): an organic phosphinic acid metal salt;
Component (B): an epoxy resin;
Component (C): dicyandiamide or a derivative thereof; and
Component (D): a curing accelerator having a dimethylureido group.

[2] The epoxy resin composition according to [1], further comprising the following Component (E):
Component (E): an imidazole-based curing accelerator having a curing initiation temperature of 100° C. or higher as measured by the following method:
[Measurement Method of a Curing Initiation Temperature]
A sample resin composition is prepared by adding 10 parts by mass of an imidazole-based curing accelerator to 100 parts by mass of a bisphenol A type epoxy resin having an epoxy equivalent of 180 to 220, and mixing the components. For this sample resin composition, the calorific value is measured using a differential scanning calorimeter (DSC) at a rate of temperature increase of 10° C./min, and the temperature at the intersection point of the tangent line at the inflection point of the DSC curve thus obtained and the baseline is designated as the curing initiation temperature.

[3] The epoxy resin composition according to [2], wherein the Component (E) is at least one selected from the group consisting of an imidazole adduct, an imidazole clathrate compound, a microencapsulated imidazole, an imidazole compound coordinated with a stabilizer, and an imidazole compound.

[4] The epoxy resin composition according to any one of [1] to [3], wherein the Component (D) is at least one compound selected from the group consisting of phenyldimethylurea, methylenebis(phenyldimethylurea), and tolylenebis(dimethylurea).

[5] The epoxy resin composition according to any one of [2] to [4], wherein the epoxy resin composition includes the Component (C) in an amount of 1 to 15 parts by mass, the Component (D) in an amount of 1 to 30 parts by mass, and the Component (E) in an amount of 1 to 30 parts by mass, with respect to 100 parts by mass of the Component (B).

[6] The epoxy resin composition according to any one of [1] to [5], wherein the epoxy resin composition includes the Component (A) in an amount such that a phosphorus atom content becomes 0.3% to 5.0% by mass in 100% by mass of the epoxy resin composition (provided that in a case in which the epoxy resin composition comprises a metal hydroxide, 100% by mass of the epoxy resin composition excluding the metal hydroxide).

[7] The epoxy resin composition according to any one of [1] to [6], further comprising the following Component (G): Component (G): a metal hydroxide.

[8] The epoxy resin composition according to [7], wherein the epoxy resin composition includes the Component (G) in an amount of 70% by mass or less in 100% by mass of the epoxy resin composition, and when the phosphorus atom content in 100% by mass of the epoxy resin composition excluding the Component (G) is designated as x, and the content of the Component (G) in 100% by mass of the epoxy resin composition including the Component (G) is designated as y, satisfying the following Expression (1):

$$y \geq -4.5x+39.8 \quad (1)$$

[9] The epoxy resin composition according to any one of [1] to [8], wherein the Component (B) includes a bisphenol F type epoxy resin.

[10] The epoxy resin composition according to any one of [1] to [9], wherein the Component (B) includes a trifunctional or higher-functional epoxy resin having an epoxy equivalent of 350 or less.

[11] The epoxy resin composition according to any one of [1] to [10], further comprising the following Component (F): Component (F): a thermoplastic resin.

[12] The epoxy resin composition according to [11], wherein the Component (F) is at least one selected from the group consisting of a phenoxy resin and a polyvinylformal resin.

[13] A molded article, obtained by molding the epoxy resin composition according to any one of [1] to [12].

[14] A prepreg, obtained by impregnating a reinforcing fiber bundle with the epoxy resin composition according to any one of [1] to [12].

[15] A fiber-reinforced composite material, obtained by curing the prepreg according to [14].

[16] A structure having a portion or the entirety thereof constructed from the fiber-reinforced composite material according to [15].

[17] The structure according to [16], wherein the structure includes at least two pieces of the fiber-reinforced composite material according to [15], and a core material, containing at least one material selected from hollow glass microspheres and foamed plastic beads, sandwiched between the pieces of the fiber-reinforced composite material, these materials being integrated together.

[18] A fiber-reinforced composite material obtained by curing a prepreg formed by impregnating a reinforcing fiber bundle with an epoxy resin composition including a phosphorus compound, the fiber-reinforced composite material having a total heat release of 65 or less as well as a peak heat release of 65 or less, as measured according to FAR 25.853 Appendix F, Part IV.

[19] A structure having a portion or the entirety thereof constructed from the fiber-reinforced composite material according to [18].

Effect of the Invention

According to the present invention, an epoxy resin composition having excellent curability and thermal stability; a prepreg; and a molded article, a fiber-reinforced composite material, and a structure, all of which are obtainable using the epoxy resin composition or the prepreg and have excellent flame retardancy and heat resistance, can be provided.

BRIEF DESCRIPTION OF DRAWINGS

FIG. 1 is a graph illustrating an example of the heat flow curve of curing heat generation at a constant temperature.

MODE(S) FOR CARRYING OUT THE INVENTION

Hereinafter, the present invention will be described in detail.

According to the present invention, the term "epoxy resin" means a compound having two or more epoxy groups in one molecule.

Furthermore, the term "epoxy resin composition" means a composition including an epoxy resin, a curing agent, a curing accelerator, and optionally other additives.

According to the present invention, the average particle size means a particle size corresponding to 50% of a volume-based cumulative distribution measured by a laser diffraction type particle size distribution analysis.

Furthermore, according to the present invention, a cured product obtainable by curing an epoxy resin composition is referred to as "resin cured product", and above all, particularly a plate-shaped cured product may be referred to as "resin plate".

"Epoxy Resin Composition"

The epoxy resin composition of the present invention includes the following Component (A), Component (B), Component (C), and Component (D). Furthermore, it is preferable that the epoxy resin composition further includes the following Component (E), Component (F), Component (G), and the like.

Component (A): an organic phosphinic acid metal salt
Component (B): an epoxy resin
Component (C): dicyandiamide or a derivative thereof
Component (D): a curing accelerator having a dimethylureido group
Component (E): an imidazole-based curing accelerator having a curing initiation temperature of 100° C. or higher as measured by the following method:

[Curing Initiation Temperature]

A sample resin composition is prepared by adding 10 parts by mass of an imidazole-based curing accelerator to 100 parts by mass of a bisphenol A type epoxy resin having an epoxy equivalent of 180 to 220, and mixing the components. For the sample resin composition, the calorific value is measured using a differential scanning calorimeter at a rate of temperature increase of 10° C./min, and the temperature at the intersection point between the tangent line at the inflection point of the DSC curve thus obtained and the baseline is designated as the curing initiation temperature.

Component (F): a thermoplastic resin

Component (G): a metal hydroxide

<Component (A)>

Component (A) is an organic phosphinic acid metal salt.

Since organic phosphinic acid metal salts have large phosphorus contents, these compounds manifest satisfactory flame retardancy. Furthermore, since their decomposition temperatures are high, the bleed-out phenomenon caused by pressure, heat and the like at the time of processing does not easily occur. Furthermore, since the organic phosphinic acid metal salts are flame retardants that are insoluble in epoxy resins, an epoxy resin composition having a phosphinic acid metal salt incorporated therein causes less resin flow when, for example, the epoxy resin composition is press molded, compared to an epoxy resin composition having incorporated therein a solid flame retardant having a softening point or melting point of 150° C. or lower, or a liquid flame retardant, which are conventionally used. Furthermore, organic phosphinic acid metal salts are not easily hydrolyzed, and the characteristic of being hydrophobic is also preferable. In addition, an epoxy resin composition containing an organic phosphinic acid metal salt is such that in a regard to viscosity change against shear rate, since the epoxy resin composition has a small width of change in viscosity at the time of a high shear rate, the epoxy resin composition has excellent coatability.

The organic phosphinic acid metal salt may be, for example, a compound represented by the following Formula (i):

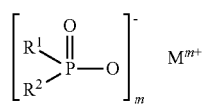

In Formula (i), $R^1$ and $R^2$ each independently represent an alkyl group or an aryl group; M represents at least one selected from the group consisting of Mg, Ca, Al, Sb, Sn, Ge, Ti, Zn, Fe, Zr, Ce, Bi, Sr, Mn, Ni, Li, K, and Na; and m represents an integer from 1 to 4.

The alkyl group and the aryl group may be linear, or may be branched.

The numbers of carbon atoms of the alkyl group and the aryl group are each preferably 1 to 6.

Regarding $R^1$ and $R^2$, an alkyl group having 1 to 6 carbon atoms is more preferred, and a methyl group or an ethyl group is particularly preferred.

Regarding M, Al is preferred.

Examples of the compound represented by Formula (i) include aluminum trisdiethylphosphinate, aluminum trismethylethylphosphinate, aluminum trisdiphenylphosphinate, zinc bisdiethylphosphinate, zinc bismethylethylphosphinate, and titanyl bisdiphenylphosphinate. Among these, from the viewpoint that an epoxy resin composition having high flame retardancy or moisture resistance is obtained, aluminum trisdiethylphosphinate and aluminum trismethylethylphosphinate are preferred.

These may be used singly, or two or more kinds thereof may be used in combination.

Also, regarding the Component (A), a commercially available product may be used, or a compound synthesized by a known production method may also be used.

Examples of a commercially available product of an organic phosphinic acid metal salt or a composite thereof include, but are not limited to, EXOLIT OP930, OP935, and OP1230 (all manufactured by Clariant Japan K.K.).

The average particle size of the organic phosphinic acid metal salt is preferably 50 µm or less, more preferably 20 µm or less, and even more preferably 10 µm or less. When the average particle size is 50 µm or less, sufficient flame retardancy can be more easily manifested. Furthermore, there is a tendency that mechanical characteristics or satisfactory external appearance of the fiber-reinforced composite material may be obtained more easily. Therefore, it is preferable that the average particle size of the organic phosphinic acid metal salt is as small as possible; however, as the average particle size becomes smaller, the viscosity of the epoxy resin composition may become so high that it is difficult to prepare the epoxy resin composition. Therefore, from the viewpoint of workability, the average particle size of the organic phosphinic acid metal salt is preferably 0.01 µm or more, and more preferably 0.05 µm or more.

The particle size of the organic phosphinic acid metal salt can be adjusted by pulverizing the organic phosphinic acid metal salt in advance using a bead mill or the like, or by pulverizing the organic phosphinic acid metal salt using a three-roll or the like at the time of mixing with the Component (B) and the like that will be described below.

The content of the Component (A) is preferably an amount such that the phosphorus atom content will be 0.3% to 5.0% by mass, and more preferably 0.5% to 4.5% by mass, in 100% by mass of the epoxy resin composition (provided that in a case in which the epoxy resin composition includes Component (G), 100% by mass of the epoxy resin composition excluding the Component (G)). When the phosphorus atom content is 0.3% by mass or more, flame retardancy of the resin cured product is further enhanced, and a fiber-reinforced composite material having superior flame retardancy is likely to be obtained. On the other hand, when the phosphorus atom content is 5.0% by mass or less, an epoxy resin composition having a fast curing rate is likely to be obtained.

<Component (B)>

Component (B) is an epoxy resin. It is preferable that the Component (B) does not include a phosphorus-containing epoxy resin. When the Component (B) does not include a phosphorus-containing epoxy resin, a resin composition having more satisfactory coatability is obtained, and therefore, it is preferable.

The epoxy resin is not particularly limited, and examples thereof include bisphenol type epoxy resins such as a bisphenol A type epoxy resin, a bisphenol F type epoxy resin, and a bisphenol S type epoxy resin; biphenyl type epoxy resins; naphthalene type epoxy resins; dicyclopentadiene type epoxy resins; novolac type epoxy resins such as a phenol novolac type epoxy resins and a cresol novolac type epoxy resin; triphenylmethane type epoxy resins; glycidylamine type epoxy resins such as tetraglycidyldiaminodiphenylmethane and triglycidylaminophenol; glycidyl ether type epoxy resins other than those described above, such as tetrakis(glycidyloxyphenyl)ethane and tris(glycidyloxy)methane; phenol aralkyl type epoxy resins; and epoxy resins obtained by modifying these resins.

These may be used singly, or two or more kinds thereof may be used in combination.

Regarding the epoxy resin, a bifunctional epoxy resin and a trifunctional or higher-functional epoxy resin are preferred.

Regarding the bifunctional epoxy resin, a bisphenol A type epoxy resin, a bisphenol F type epoxy resin, and a biphenyl type epoxy resin are more preferred. From the viewpoint that particularly excellent flame retardancy is obtained, specifically in order to easily obtain a fiber-reinforced composite material having superior flame retardancy, whose total heat release and peak heat release described in FAR 25.853 Appendix F, Part IV, are both 65 or less, the bifunctional epoxy resin is particularly preferably a bisphenol F type epoxy resin.

Regarding the trifunctional or higher-functional epoxy resin, a phenol novolac type epoxy resin, a cresol novolac type epoxy resin, a triphenylmethane type epoxy resin, a glycidylamine type epoxy resin, and a phenol aralkyl type epoxy resin are particularly preferred. Among them, from the viewpoint of obtaining superior flame retardancy, an epoxy resin having a relatively small molecular weight and a relatively small epoxy equivalent is preferred. Specifically, the epoxy equivalent is preferably 350 or less, more preferably 300 or less, and particularly preferably 250 or less.

These may be used singly, or two or more kinds thereof may be used in combination.

The content of the bifunctional epoxy resin is preferably 10% by mass or more, and more preferably 15% by mass or more, in 100% by mass of the Component (B). The upper limit is preferably 95% by mass or less, more preferably 90% by mass or less, even more preferably 85% by mass or less, and particularly preferably 80% by mass or less. When the content of the bifunctional epoxy resin is 10% by mass or more, the resin cured product becoming brittle can be prevented, and when the content is 95% by mass or less, a resin cured product having more satisfactory heat resistance can be obtained.

The content of the trifunctional or higher-functional epoxy resin is preferably 10% by mass or more, more preferably 15% by mass or more, and even more preferably 20% by mass or more, in 100% by mass of the Component (B). Furthermore, the upper limit is preferably 95% by mass or less, more preferably 90% by mass or less, and even more preferably 85% by mass or less. When the content of the trifunctional or higher-functional epoxy resin is 10% by mass or more, a resin cured product having more satisfactory heat resistance can be obtained, and when the content is 95% by mass or less, the resin cured product becoming brittle can be prevented.

Regarding the epoxy resin, an alicyclic epoxy resin that does not contain an aromatic ring in the molecule also exists; however, an epoxy resin having an aromatic ring tends to increase flame retardancy of an epoxy resin composition including this epoxy resin. Therefore, an epoxy resin having an aromatic ring is preferred as the Component (B).

Furthermore, regarding the Component (B), a commercially available product may also be used.

Examples of a commercially available product of the epoxy resin include, but are not limited to, jER807, jER828, jER604, jER630, jER1032H60, jER152, YX-7700, and YX-4000 (all manufactured by Mitsubishi Chemical Corporation); GAN, NC-2000, and NC-3000 (all manufactured by Nippon Kagaku Co., Ltd.); YDPN-638 and TX-0911 (all manufactured by NIPPON STEEL & SUMIKIN CHEMICAL CO., LTD.); EPON 165 (all manufactured by Momentive Specialty Chemicals, Inc.); MY-0500, MY-0600, and ECN-1299 (all manufactured by Huntsman Japan K.K.); HP-4032, HP-4700, and HP-7200 (manufactured by DIC Corporation); and TACTIX742 (manufactured by Huntsman Advanced Materials, LLC).

The content of the Component (B) is preferably 45% to 96% by mass, and more preferably 48% to 93% by mass, in 100% by mass of the epoxy resin composition (provided that in a case in which the epoxy resin composition includes Component (G), 100% by mass of the epoxy resin composition excluding the Component (G)). When the content of the Component (B) is 45% by mass or more, a resin cured product having superior flame retardancy, heat resistance and mechanical characteristics is obtained. On the other hand, when the content of the Component (B) is 96% by mass or less, curing acceleration action for the epoxy resin is sufficiently obtained.

<Component (C)>

Component (C) is dicyandiamide or a derivative thereof.

Dicyandiamide and a derivative thereof have high melting points, and have low compatibility with an epoxy resin in a low temperature region. Furthermore, when the epoxy resin composition includes Component (C), an epoxy resin composition having an excellent pot life is obtained, and a resin cured product having high mechanical characteristics is obtained.

Examples of the derivative of dicyandiamide include products obtained by conjugating dicyandiamide with various compounds such as an epoxy resin, a vinyl compound, an acrylic compound, and 9,10-dihydro-9-oxa-10-phosphaphenanthrene-10-oxide.

These may be used singly, or two or more kinds thereof may also be used in combination. Furthermore, the dicyandiamide derivative may also be used in combination with dicyandiamide.

Regarding the Component (C), dicyandiamide is preferred from the viewpoint of reactivity.

Furthermore, a commercially available product may also be used as the Component (C).

Examples of a commercially available product of dicyandiamde include, but are not included in, DICY7 and DICY15 (all manufactured by Mitsubishi Chemical Corporation).

The content of Component (C) is preferably 1 to 15 parts by mass, and more preferably 2 to 14 parts by mass, with respect to 100 parts by mass of the Component (B). When the content of Component (C) is 1 part by mass or more, the epoxy resin included in the epoxy resin composition can be sufficiently cured. On the other hand, when the content of Component (C) is 15 parts by mass or less, toughness of the resin composition can be increased.

<Component (D)>

Component (D) is a curing accelerator having a dimethylureido group.

The curing accelerator having a dimethylureido group is not particularly limited as long as the compound is capable of producing an isocyanate group and dimethylamine when heated at high temperature, which are capable of activating an epoxy group of Component (B) or Component (C), and examples include an aromatic dimethylurea in which a dimethylureido group is bonded to an aromatic ring, and an aliphatic dimethylurea in which a dimethylureido group is bonded to an aliphatic compound. Among these, from the viewpoint that the curing rate becomes faster, an aromatic dimethylurea is preferred.

Regarding the aromatic dimethylurea, for example, phenyldimethylurea, methylenebis(phenyldimethylurea), and tolylenebis(dimethylurea) are suitably used. Specific examples include 4,4'-methylenebis(phenyldimethylurea) (MBPDMU), 3-phenyl-1,1-dimethylurea (PDMU), 3-(3,4-dichlorophenyl)-1,1-dimethylurea (DCMU), 3-(3-chloro-4-methylphenyl)-1,1-dimethylurea, and 2,4-bis(3,3-dimethylureido)toluene (TBDMU). Among these, from the viewpoint of curing acceleration ability or from the viewpoint of imparting heat resistance to the resin cured product, MBPDMU, TBDMU, and PDMU are more preferred.

These may be used singly, or two or more kinds thereof may also be used in combination.

Examples of the aliphatic dimethylurea include a dimethylurea obtainable from isophorone diisocyanate and dimethylamine, a dimethylurea obtainable from m-xylene diisocyanate and dimethylamine, and a dimethylurea obtainable from hexamethylene diisocyanate and dimethylamine.

Furthermore, a commercially available product may also be used as the Component (D).

Examples of a commercially available product of MBP-DMU include, but are not limited to, TECHNICURE MDU-11 (all manufactured by A & C Catalysts, Inc.); and OMICURE 52 (all manufactured by PTI JAPAN Corporation).

Examples of a commercially available product of PDMU include, but are not limited to, OMICURE 94 (all manufactured by PTI JAPAN Corporation)

Examples of a commercially available product of TBDMU include, but are not limited to, OMICURE 24 (all manufactured by PTI JAPAN Corporation).

The content of the Component (D) is preferably 1 to 30 parts by mass, and more preferably 2 to 25 parts by mass, with respect to 100 parts by mass of the Component (B). When the content of the Component (D) is 1 part by mass or more, the curing accelerating action for the epoxy resin included in the epoxy resin composition is sufficiently obtained. On the other hand, when the content of the Component (D) is 30 parts by mass or less, a resin cured product having superior flame retardancy, heat resistance and mechanical characteristics is obtained.

<Component (E)>

Component (E) is an imidazole-based curing accelerator having a curing initiation temperature of 100° C. or higher.

The curing initiation temperature as used herein is a value measured by the following method. First, a sample resin composition is prepared by adding 10 parts by mass of an imidazole-based curing accelerator to 100 parts by mass of a bisphenol A type epoxy resin having an epoxy equivalent of 180 to 220, and mixing the components. For the sample resin composition, the calorific value is measured using a differential scanning calorimeter (DSC) at a rate of temperature increase of 10° C./min, and the temperature at the intersection point between the tangent line at the inflection point of the DSC curve thus obtained and the baseline is designated as the curing initiation temperature of the imidazole-based curing accelerator.

An imidazole-based curing accelerator has a nitrogen atom having a non-covalent pair of electrons in its structure, and this nitrogen atom activates the epoxy group of Component (B) or Component (C) and accelerates curing.

Since an imidazole-based curing accelerator having a curing initiation temperature of 100° C. or higher has low reactivity at a relatively low temperature such as room temperature, an epoxy resin composition including this has high thermal stability. Therefore, the resin composition or a prepreg containing this resin composition has high storage stability and exhibits high curing accelerating properties at the molding processing temperature for the epoxy resin composition, which is preferable. It is more preferable that the curing initiation temperature is 110° C. or higher.

Also, generally, a cured product of an epoxy resin composition including an imidazole-based curing agent or curing accelerator tends to have inferior toughness (brittle) compared to a resin cured product obtained by using a different curing agent or curing accelerator. However, when Component (E) is used in combination with the Components (A) to (D) in the epoxy resin composition of the present invention, the flexural strength and bending strain of the resin cured product obtainable therefrom are enhanced. Even from this point of view, it is preferable that the epoxy resin composition includes the Component (E).

Regarding the Component (E), if the curing initiation temperature is 100° C. or higher, an imidazole compound may be used per se, or at least one curing accelerator selected from the group consisting of an imidazole adduct of a general imidazole compound, a clathrate imidazole, a microencapsulated imidazole, and an imidazole compound coordinated with a stabilizer may also be used.

Furthermore, since these curing accelerators have deteriorated activity by subjecting an imidazole compound to an adduct treatment, a clathration treatment with heterodimers, or a microencapsulation treatment, or by coordinating an imidazole compound with a stabilizer, the curing accelerators have high curing acceleration ability at the time of curing, while exhibiting an excellent pot life in a low temperature region. If the curing initiation temperature is 100° C. or higher, the imidazole compound may be, or may not be, subjected to an adduct treatment, a clathration treatment with heterodimers, a microencapsulation treatment, or coordination with a stabilizer.

Examples of the imidazole compound having a curing initiation temperature of 100° C. or higher include 2,4-diamino-6-[2'-methylimidazolyl-(1')]-ethyl-s-triazine, 1-cyanoethyl-2-phenylimidazolium trimellitate, 2-phenyl-4,5-dihydroxymethylimidazole, and 2-phenyl-4-methyl-5-hydroxymethylimidazole.

Specific examples of imidazole before being subjected to an adduct treatment, a clathration treatment with heterodimers, a microencapsulation treatment, or coordination with a stabilizer include, in addition to the compounds described above, 2-methylimidazole, 2-ethyl-4-methylimidazole, 2-undecylimidazole, 2-heptadecylimidazole, 1,2-dimethylimidazole, 2-phenylimidazole, 2-phenyl-4-methylimidazole, 1-benzyl-2-phenylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-ethyl-4-methylimidazolium trimellitate, 1-cyanoethyl-2-undecylimidazolium trimellitate, 1-cyanoethyl-2-phenylimidazolium trimellitate, 2,4-diamino-6-(2'-methylimidazolyl-(1'))-ethyl-s-triazine, 2,4-diamino-6-(2'-undecylimidazolyl-(1'))-ethyl-s-triazine, 2,4-diamino-6-(2'-ethyl-4-methylimidazolyl-(1'))-ethyl-s-triazine, 2,4-diamino-6-(2'-methylimidazolyl-(1'))-ethyl-s-triazine-isocyanuric acid adduct, 2-phenylimidazole-isocyanuric acid adduct, 2-methylimidazole-isocyanuric acid adduct, 1-cyanoethyl-2-phenyl-4,5-di(2-cyanoethoxy)methylimidazole, 2-phenyl-4,5-dihydroxymethylimidazole, and 2-phenyl-4-methyl-5-hydroxymethylimidazole. However, the examples are not limited to these.

Furthermore, a commercially available product may also be used as the Component (E).

Examples of a commercially available product of an imidazole adduct having a structure in which an imidazole compound is ring-opening added to an epoxy group of an epoxy resin, include, but are not limited to, PN-50, PN-50 J, PN-40, PN-40 J, PN-31, PN-23, and PN-H (all manufactured by Ajinomoto Fine-Techno Co., Inc.).

Examples of a commercially available product of a clathrate imidazole include, but are not limited to, TIC-188, KM-188, HIPA-2P4MHZ, NIPA-2P4MHZ, TEP-2E4MZ, HIPA-2E4MZ, and NIPA-2E4MZ (all manufactured by Nippon Soda Co., Ltd.).

Examples of a commercially available product of a microencapsulated imidazole include, but are not limited to, NOVACURE HX3721, HX3722, HX3742, and HX3748 (all manufactured by Asahi Kasei E-Materials Corporation); and LC-80 (all manufactured by A&C Catalysts, Inc.).

An imidazole compound coordinated with a stabilizer can be prepared by, for example, combining an imidazole adduct manufactured by SHIKOKU CHEMICALS CORPORATION, CUREDUCT P-0505 (bisphenol A diglycidyl ether/2-ethyl-4-methylimidazole adduct), with a stabilizer manufactured by SHIKOKU CHEMICALS CORPORATION, L-07N (epoxy-phenol-boric acid ester blend). Even if the various imidazoles or imidazole compounds such as imidazole adducts mentioned above are used instead of the CUREDUCT P-0505, a similar effect is obtained. Regarding an imidazole compound before being coordinated with a stabilizer, a compound having low solubility in an epoxy resin is suitably used, and from this point of view, CUREDUCT is preferred.

The content of the Component (E) is preferably 1 to 30 parts by mass, and more preferably 2 to 25 parts by mass, with respect to 100 parts by mass of the Component (B). When the content of the Component (E) is 1 part by mass or more, curing acceleration action for the epoxy resin included in the epoxy resin composition is sufficiently obtained. On the other hand, when the content of the Component (E) is 30 parts by mass or less, a resin cured product having superior flame retardancy, heat resistance and mechanical characteristics is obtained.

<Component (F)>

Component (F) is a thermoplastic resin.

Component (F) is incorporated into the epoxy resin composition for the purpose of resin flow control at the time of molding, or for the purpose of imparting toughness to the resin cured product.

Examples of the Component (F) include polyamide, polyester, polycarbonate, polyether sulfone, polyphenylene ether, polyphenylene sulfide, polyether ether ketone, polyether ketone, polyimide, polytetrafluoroethylene, polyether, polyolefin, a liquid crystal polymer, polyallylate, polysulfone, polyacrylonitrile-styrene, polystyrene, polyacrylonitrile, polymethyl methacrylate, ABS AES, ASA, polyvinyl chloride, a polyvinylformal resin, and a phenoxy resin. Among these, from the viewpoint of having excellent resin flow controllability or the like, polyether sulfone, a phenoxy resin, and a polyvinylformal resin are preferred. Furthermore, a polyether sulfone resin is preferable also from the viewpoint of further increasing heat resistance of the resin cured product, a phenoxy resin is preferable from the viewpoint of further increasing flame retardancy of the resin cured product, and a polyvinylformal resin is preferable also from the viewpoint that the tackiness of a prepreg thus obtainable can be easily controlled to an appropriate range.

These may be used singly, or two or more kinds thereof may be used in combination.

The content of the Component (F) is preferably 1 to 50 parts by mass, and more preferably 2 to 40 parts by mass, with respect to 100 parts by mass of the Component (B). When the content of the Component (F) is 1 part by mass or more, satisfactory property improving effects are manifested. On the other hand, when the content of the Component (F) is 50 parts by mass or less, heat resistance of the resin cured product or drapability of the prepreg are likely to be maintained satisfactorily.

<Component (G)>

Component (G) is a metal hydroxide.

There are no particular limitations on the metal hydroxide, and inorganic flame retardants may be mentioned. Specific examples include aluminum hydroxide and magnesium hydroxide. Among these, aluminum hydroxide is preferred from the viewpoints of the thermal decomposition temperature and the endothermic amount at the time of decomposition.

These may be used singly, or two or more kinds thereof may be used in combination.

Regarding the metal hydroxide, a particulate metal hydroxide is usually used. The average particle size of the metal hydroxide is preferably 15 µm or less, and more preferably 2.5 µm or less, from the viewpoints of flame retardancy and dispersibility. However, if the average particle size becomes small, the viscosity of the epoxy resin composition becomes excessively high, and it may be difficult to prepare the epoxy resin composition. Therefore, from the viewpoint of workability, the average particle size of the metal hydroxide is preferably 0.01 µm or more, and more preferably 0.05 µm or more.

The metal hydroxide may be subjected to a surface treatment as necessary. Examples of the surface treatment include a surface treatment using stearic acid, and a surface treatment using a coupling agent.

Furthermore, a commercially available product may be used as the Component (G), or a product synthesized by a known production method may also be used.

Examples of a commercially available product of aluminum hydroxide include, but are not limited to, C-303, C-301N, and C-300GT (all manufactured by Sumitomo Chemical Co., Ltd.); HIGILITE H-42 and H-43 (all manufactured by Showa Denko K.K.).

Examples of a commercially available product of magnesium hydroxide include, but are not limited to, MAGSTAR #5, #4, and #2, ECOMAG PZ-1, and Z-10 (manufactured by Tateho Chemical Industries, Co., Ltd.).

The content of the Component (G) is preferably 5% by mass or more, and more preferably 10% by mass or more, in 100% by mass of the epoxy resin composition. Furthermore, the upper limit is preferably 70% by mass or less, and more preferably 60% by mass or less. When the content of the Component (G) is 5% by mass or more, flame retardancy of the epoxy resin composition is further enhanced. On the other hand, when the content of the Component (G) is 70% by mass or less, it is easy to adjust the viscosity of the epoxy resin composition to an appropriate range, and productivity of the prepreg is increased. Furthermore, the mechanical properties of the fiber-reinforced composite materials are maintained at a satisfactory level.

Furthermore, when the phosphorus atom content in 100% by mass of the epoxy resin composition excluding the Component (G) is designated as x, and the content of the Component (G) in 100% by mass of the epoxy resin composition including the Component (G) is designated as y, it is preferable that the following Expression (1) is satisfied. When the phosphorus atom content, x, and the content of the Component (G), y, satisfy the following Expression (1), a fiber-reinforced composite material having highly excellent flame retardancy can be easily obtained. Specifically, a fiber-reinforced composite material having a total heat release of 65 or less and a peak heat release of 65 or less as measured according to FAR 25.853 Appendix F, Part IV, can be easily obtained.

$$y \geq 4.5x + 39.8 \quad (1)$$

<Optional Components>

The epoxy resin composition may also include various known additives, if necessary, to the extent that the effects of the present invention are not impaired.

Examples of the additives include flame retardants other than the Component (A) (for example, a phosphorus-containing epoxy resin, red phosphorus, a phosphazene compound, a phosphoric acid salt, and a phosphoric acid ester); mold releasing agents such as a silicone oil, a wetting dispersant, an antifoaming agent, a defoaming agent, a natural wax, a synthetic wax, a metal salt of a linear fatty acid, an acid amide, an ester, and a paraffin; powders such as crystalline silica, molten silica, calcium silicate, alumina, calcium carbonate, talc, and barium sulfate; inorganic fillers such as glass fibers and carbon fibers; colorants such as carbon black and red iron oxide; and a silane coupling agent.

These may be used singly, or two or more kinds thereof may be used in combination.

<Physical Properties of Epoxy Resin Composition>

The epoxy resin composition of the present invention is, for example, impregnated into a reinforcing fiber aggregate and is thereby used for producing a prepreg as will be described below.

The viscosity of the epoxy resin composition at 60° C. is preferably 10 Pa·s or more, more preferably 20 Pa·s or more, and even more preferably 30 Pa·s or more, from the viewpoint of adjusting tackiness of the prepreg surface thus obtainable, or fluidity control of the resin at the time of molding (suppression of disturbance of reinforcing fibers). Furthermore, from the viewpoints of impregnability into a reinforcing fiber aggregate and molding processability of the prepreg, the viscosity of the epoxy resin composition is preferably 3,000 Pa·s or less, more preferably 2,900 Pa·s or less, and even more preferably 2,800 Pa·s or less.

The viscosity of the epoxy resin composition at 60° C. is determined by, for example, measuring the viscosity with a rotational viscometer using 25-mmφ parallel plates, at a plate gap of 500 μm, with the temperature increasing at a rate of temperature increase of 2° C./min, at an angular velocity of 10 rad/sec, and a stress of 300 Pa.

Furthermore, it is preferable that the epoxy resin composition has a low glass transition temperature. Specifically, the glass transition temperature is preferably 15° C. or lower, and more preferably 10° C. or lower. When the glass transition temperature of the epoxy resin composition is 15° C. or lower, it is preferable because a prepreg having appropriate tackiness and shape-retaining properties is obtained, and the lamination operation at the time of molding can be carried out satisfactorily.

Here, the glass transition temperature of the epoxy resin composition was measured according to the method described in JIS K 7121 using a differential scanning calorimeter (DSC) in a nitrogen atmosphere at a rate of temperature increase of 10° C./min and a measurement temperature in the range of −20° C. to 50° C., and an intermediate point of a part in which the DSC curve exhibits a step-like change was designated as the glass transition temperature (Tg) of the epoxy resin composition.

<Method for Producing Epoxy Resin Composition>

The epoxy resin composition of the present invention is obtained by, for example, mixing the various components mentioned above.

Regarding the method for mixing various components, a method of using a mixing machine such as a three-roll mill, a planetary mixer, a kneader, a homogenizer, or a HomoDisper may be employed.

<Operating Effects>

Since the epoxy resin composition of the present invention described above includes the Component (A), Component (B), Component (C), and Component (D) described above, the epoxy resin composition has excellent curability and thermal stability. When the epoxy resin composition of the present invention is used, a fiber-reinforced composite material having excellent flame retardancy and heat resistance can be obtained.

Since the epoxy resin composition of the present invention has excellent curability, the epoxy resin composition can be sufficiently cured under, for example, the conditions of 150° C. within 20 minutes.

"Molded Article"

The molded article of the present invention is formed by molding the epoxy resin composition of the present invention described above.

Examples of the molding method for the epoxy resin composition include a injection molding method (including insert molding of a film, a glass plate or the like), an injection compression molding method, a compression molding method, a blow molding method, a vacuum molding method, a pressure molding method, a calender molding method, and an inflation molding method. Among these, from the viewpoint that a molded article having high dimensional accuracy can be obtained with excellent mass productivity, an injection molding method and an injection compression molding method are preferred.

Since the molded article of the present invention is formed by molding the epoxy resin composition of the present invention, the molded article has excellent flame retardancy and heat resistance.

The molded article of the present invention can be applied to, for example, housings for mobile equipment, manufactured products for automotive vehicles, products for furniture, and products for construction materials.

"Prepreg"

The prepreg of the present invention is a product obtained by impregnating a reinforcing fiber aggregate with the epoxy resin composition of the present invention described above (impregnation product).

The content of the epoxy resin composition with respect to the total mass of the prepreg (hereinafter, referred to as "resin content") is preferably 15% to 50% by mass, more preferably 20% to 45% by mass, and even more preferably 25% to 40% by mass. When the resin content is 15% by mass or more, sufficient adhesiveness between the reinforcing fiber aggregate and the epoxy resin composition can be secured, and when the resin content is 50% by mass or less, flame retardancy is further enhanced.

The reinforcing fibers that constitute the reinforcing fiber aggregate are not particularly limited, and may be appropriately selected from among known reinforcing fibers that constitute fiber-reinforced composite materials, according to the application or the like. For example, various inorganic fibers or organic fibers, such as carbon fibers, aramid fibers, nylon fibers, high-strength polyester fibers, glass fibers, boron fibers, alumina fibers, and silicon nitride fibers, can be used. Among these, from the viewpoint of flame retardancy, carbon fibers, aramid fibers, glass fibers, boron fibers, alumina fibers, and silicon nitride fibers are preferred, and from the viewpoint of having excellent specific strength, specific elasticity, and electromagnetic wave shielding properties, carbon fibers are particularly preferred.

These may be used singly, or two or more kinds thereof may be used in combination.

While the details will be described below, in a case in which a fiber-reinforced composite material obtainable by curing the prepreg of the present invention is used in a portion or the entirety of a structure, the strand tensile strength of the carbon fibers is preferably 1.0 to 9.0 GPa, and more preferably 1.5 to 9.0 GPa, and the strand tensile modulus of the carbon fibers is preferably 150 to 1,000 GPa, and more preferably 200 to 1,000 GPa, from the viewpoint of rigidity of the fiber-reinforced composite material.

The strand tensile strength and the strand tensile modulus of the carbon fibers are measured according to JIS R 7601 (1986).

There are no particular limitations on the form of the reinforcing fiber aggregate, and any form that is used as a conventional base material for prepregs can be employed. For example, an aggregate obtained by uniaxially aligning reinforcing fibers may be used, or a woven fabric, a non-woven fabric, or a non-crimped fabric may also be used.

Since the prepreg of the present invention is formed by impregnating a reinforcing fiber aggregate with the epoxy resin composition of the present invention, when the prepreg is cured, a fiber-reinforced composite material having excellent flame retardancy and heat resistance can be obtained.

"Fiber-Reinforced Composite Material"

The fiber-reinforced composite material of the present invention is a product obtainable by curing the prepreg of the present invention described above (cured product).

Since a fiber-reinforced composite material should be excellent in flame retardancy, heat resistance, electromagnetic wave shielding properties, mechanical characteristics and the like, it is preferable that the fiber-reinforced composite material includes carbon fibers as the reinforcing fibers.

The fiber-reinforced composite material can be produced by a known method using the prepreg of the present invention, and examples of the production method include an autoclave molding method, a vacuum bag molding method, and a press molding method. Among these, from the viewpoint that the features of the epoxy resin composition of the present invention can be sufficiently utilized, productivity is high, and a high-quality fiber-reinforced composite material can be easily obtained, a press molding method is preferred.

In a case in which the fiber-reinforced composite material is produced by a press molding method, it is preferable that the prepreg of the present invention, or a preform produced by laminating the prepreg of the present invention is inserted into a mold that has been adjusted to the curing temperature in advance and is heated and pressed, and thereby the prepreg or the preform is cured.

The temperature inside the mold when press molding is performed is preferably 100 to 160° C. It is preferable that the prepreg or the preform is cured for 1 to 20 minutes under the condition of 1 to 150 MPa.

Since the fiber-reinforced composite material of the present invention includes a cured product of the epoxy resin composition of the present invention, the fiber-reinforced composite material has excellent flame retardancy and heat resistance. In regard to flame retardancy, for example, when the fiber-reinforced composite material is produced into a fiber-reinforced composite material molded plate having a thickness of about 1 mm, it is possible to achieve the flame retardancy of Level V-0 or V-1 in the UL-94V test. Particularly, if the epoxy resin composition contains the Component (A) and the Component (G) in predetermined amounts, the crosslinking density of the resin cured product is increased. Thus, when a combustion test is performed according to the standards of FAR 25.853 Appendix F, Part IV, where a flame retardancy level even higher than that of UL-94V is required, the total heat release and the peak heat release can be both adjusted to a value of 65 or less. The total heat release is an integral value of the heat release rate, and the peak heat release is the maximum value of the heat release rate.

Therefore, the fiber-reinforced composite material of the present invention is useful for applications where high flame retardancy performance or excellent heat resistance is required. Examples of such applications include materials for the housings for electric/electronic equipment, and materials for interior decoration of aircrafts and automobiles.

"Structure"

The structure of the present invention has a portion or the entirety thereof constructed from the fiber-reinforced composite material of the present invention described above. That is, the structure of the present invention may be formed only from the fiber-reinforced composite material of the present invention, or may be constructed from the fiber-reinforced composite material of the present invention and another material (for example, a metal or an injection molded member made of a thermoplastic resin).

Furthermore, the structural material of the present invention may be a material which includes at least two pieces of a fiber-reinforced composite material, and has a core material containing at least one of hollow glass microspheres and foamed plastic beads sandwiched between the pieces of the fiber-reinforced composite material, these materials being integrated together. More specifically, for example, a structure obtainable by sandwiching a core material containing at least one of hollow glass microspheres and foamed plastic beads, which has been produced in advance, between the prepregs according to the present invention, and integrating the assembly by press molding in a forming die, may be mentioned. Such a core material is preferable because the core material does not easily collapse even in a case in which the core material is press molded integrally with the prepregs, and does not generate cracks. The structure thus obtained is lightweight and highly rigid and has high flame retardancy, and accordingly, the structure is particularly useful for the housings of electronic/electric equipment such as laptop computers.

Since the structure of the present invention has a portion or the entirety thereof constructed from the fiber-reinforced composite material of the present invention, the structure has excellent flame retardancy and heat resistance.

The structure of the present invention can be applied to, for example, housings for electric/electronic equipment, and interior decorative members for aircrafts and automobiles.

EXAMPLES

Hereinafter, the present invention will be specifically described by way of Examples; however, the present invention is not intended to be limited to these.

The raw materials used in Examples and Comparative Examples will be disclosed below "Raw Materials"

<Component (A)>

OP935: Trisdiethylphosphinic acid aluminum salt, phosphorus atom content: 23.0% by mass, average particle size: 2 to 3 μm, maximum particle size: less than 10 μm, "EXOLIT OP935" manufactured by Clariant Japan K.K.

OP930: Trisdiethylphosphinic acid aluminum salt, phosphorus atom content: 23.0% by mass, average particle size: 3 to 4 μm, maximum particle size: 10 μm or more and less than 20 μm, "EXOLIT OP930" manufactured by Clariant Japan K.K.

<Component (B)> jER828: Liquid bisphenol A type epoxy resin, epoxy equivalent: 189 g/eq, "jER828" manufactured by Mitsubishi Chemical Corporation jER807: Liquid bisphenol F type epoxy resin, epoxy equivalent: 168 g/eq, "jER807" manufactured by Mitsubishi Chemical Corporation jER630: N,N-diglycidyl-4-glycidyloxyaniline, liquid at normal temperature, epoxy equivalent: 97 g/eq, "jER630" manufactured by Mitsubishi Chemical Corporation EPON165: Solid cresol novolac type epoxy resin, epoxy equivalent: 220 g/eq, "EPON165" manufactured by Momentive Specialty Chemicals Corp.

TACTIX742: Triphenylmethane type epoxy resin, semisolid at normal temperature, epoxy equivalent: 160 g/eq, "TACTIX 742" manufactured by Huntsman Advanced Materials, LLC.

<Component (C)>

DICY15: Dicyandiamide, active hydrogen equivalent: 21 g/eq, "jERCURE DICY15" manufactured by Mitsubishi Chemical Corporation <Component (D)>

OMICURE24: 2,4-Bis(3,3-dimethylureido)toluene, "OMICURE 24" manufactured by PTI JAPAN Corporation MDU-11: 4,4'-Methylenebisphenyldimethylurea, "TECHNICURE MDU-11" manufactured by A&C Catalysts, Inc.

OMICURE94: Phenyldimethylurea, "OMICURE 94" manufactured by PTI JAPAN Corporation <Component (E)>

PN-50: Imidazole adduct, softening point 115° C., "AMICURE PN-50" manufactured by Ajinomoto Fine-Techno Co., Inc.

PN-H: Imidazole adduct, softening point 115° C., "AMICURE PN-H" manufactured by Ajinomoto Fine-Techno Co., Inc.

PN-23: Imidazole adduct, softening point 100° C., "AMICURE PN-23" manufactured by Ajinomoto Fine-Techno Co., Inc.

PN-31: Imidazole adduct, softening point 115° C., "AMICURE PN-31" manufactured by Ajinomoto Fine-Techno Co., Inc.

PN-40: Imidazole adduct, softening point 110° C., "AMICURE PN-40" manufactured by Ajinomoto Fine-Techno Co., Inc.

TIC-188: Clathrate imidazole, the host molecule being 1,1,2,2-tetrakis(4-hydroxyphenyl)ethane, the guest molecule being 2-phenyl-4-methyl-5-hydroxymethylimidazole (2P4MHZ). "NISSOCURE TIC-188" manufactured by Nippon Soda Co., Ltd.

KM-188: Clathrate imidazole, the host molecule being 1,1,2,2-tetrakis(4-hydroxyphenyl)ethane, the guest molecule being 2-phenyl-4-methyl-5-hydroxymethylimidazole (2P4MHZ). "NISSOCURE KM-188" manufactured by Nippon Soda Co., Ltd.

HIPA-2P4MHZ: Clathrate imidazole, the host molecule being 5-hydroxyisophthalic acid (HIPA), the guest molecule being 2-phenyl-4-methyl-5-hydroxymethylimidazole (2P4MHZ). "NISSOCURE HIPA-2P4MHZ" manufactured by Nippon Soda Co., Ltd.

NIPA-2P4MHZ: Clathrate imidazole, the host molecule being 5-nitroisophthalic acid (NIPA), the guest molecule being 2-phenyl-4-methyl-5-hydroxymethylimidazole (2P4MH). "NISSOCURE NIPA-2P4MHZ" manufactured by Nippon Soda Co., Ltd.

TEP-2E4MZ: Clathrate imidazole, the host molecule being 1,1,2,2-tetrakis(4-hydroxyphenyl)ethane (TEP), the guest molecule being 2-ethyl-4-methylimidazole (2E4MZ). "NISSOCURE TEP-2E4MZ" manufactured by Nippon Soda Co., Ltd.

HIPA-2E4MZ: Clathrate imidazole, the host molecule being 5-hydroxyisophthalic acid (HIPA), the guest molecule being 2-ethyl-4-methylimidazole (2E4MZ). "NISSOCURE HIPA-2E4MZ" manufactured by Nippon Soda Co., Ltd.

NIPA-2E4MZ: Clathrate imidazole, 5-nitroisophthalic acid (NIPA), the guest molecule being 2-ethyl-4-methylimidazole (2E4MZ). "NISSOCURE NIP-2E4MZ" manufactured by Nippon Soda Co., Ltd.

2P4MHZ-PW/L-07N: Compound composed of 2-phenyl-4-methyl-5-hydroxymethylimidazole (2P4MHZ-PW) coordinated with "CUREDUCT L-07N" (epoxy-phenol-boric acid ester blend) manufactured by SHIKOKU CHEMICALS CORPORATION as a stabilizer.

2MZA-PW: 2,4-Diamino-6-[2'-methylimidazolyl-(1')]-ethyl-s-triazine, "2MZA-PW" manufactured by SHIKOKU CHEMICALS CORPORATION 2PZCNS-PW: 1-Cyanoethyl-2-phenylimidazolium trimellitate, "2PZCNS-PW" manufactured by SHIKOKU CHEMICALS CORPORATION 2PHZ-PW: 2-Phenyl-4,5-dihydroxymethylimidazole, "2PHZ-PW" manufactured by SHIKOKU CHEMICALS CORPORATION 2P4MHZ-PW: 2-Phenyl-4-methyl-5-hydroxymethylimidazole, "2P4MHZ-PW" manufactured by SHIKOKU CHEMICALS CORPORATION 2E4MZ: 2-Ethyl-4-methylimidazole, "2E4MZ" manufactured by SHIKOKU CHEMICALS CORPORATION <Component (F)>

VINYLEC E: Polyvinylformal resin, "VINYLEC E" manufactured by CHISSO CORPORATION YP-70: Phenoxy resin, "YP-70" manufactured by NIPPON STEEL & SUMIKIN CHEMICAL CO., LTD.

<Component (G)>

C-301N: Aluminum hydroxide, "C-301N" manufactured by Sumitomo Chemical Co., Ltd.

<Carbon Fibers>

Carbon fibers: "PYROFIL TR50S15L" manufactured by MITSUBISHI RAYON CO., LTD.

Furthermore, the curing initiation temperatures of the various Components (E) calculated by the following measurement method are as follows.

Regarding the curing initiation temperature, the calorific value was measured for a sample resin composition prepared by adding 10 parts by mass of the subject imidazole-based curing accelerator to 100 parts by mass of a bisphenol A type epoxy resin having an epoxy equivalent of 189 ("jER828" manufactured by Mitsubishi Chemical Corporation) and mixing the components, using a differential scanning calorimeter (DSC) at a rate of temperature increase of 10° C./min, and the temperature at the intersection between the tangent line at the inflection point of the DSC curve thus obtained and the baseline was designated as the curing initiation temperature.

TABLE 1

| | Type | | Curing initiation temperature (° C.) |
|---|---|---|---|
| Component (E) | Imidazole adduct | PN-50 | 125.4 |
| | | PN-H | 113.4 |
| | | PN-23 | 112.9 |
| | | PN-31 | 116.5 |
| | | PN-40 | 118.5 |
| | Clathrate imidazole | TIC-188 | 159.3 |
| | | KM-188 | 160.7 |
| | | HIPA-2P4MHZ | 170.1 |
| | | NIPA-2P4MHZ | 171.0 |
| | | TEP-2E4MZ | 135.8 |
| | | HIPA-2E4MZ | 152.6 |
| | | NIPA-2E4MZ | 156.8 |
| | Stabilizer-coordinated imidazole | 2P4MHZ-PW/L-07N | 158.6 |
| | Imidazole compound | 2MZA-PW | 139.1 |
| | | 2PZCNS-PW | 117.4 |
| | | 2PHZ-PW | 170.5 |
| | | 2P4MHZ-PW | 150.7 |
| | | 2E4MZ | 107.1 |

Example 1

An epoxy resin composition was prepared as follows, using OP935 as Component (A), jER828 and EPON165 as Components (B), DICY15 as Component (C), and OMICURE24 as Component (D).

First, the Components (B) (liquid), the Component (C) (solid), and the Component (D) (solid) were weighed in a vessel according to the composition described in Table 2, such that the mass ratio of the solid components and the liquid components would be 1:1, and the components were stirred and mixed. This mixture was further mixed thoroughly with a three-roll mill, and a curing agent master batch was obtained.

Subsequently, components other than the Component (A) and the components of the curing agent master batch in the composition described in Table 2 were weighed in a flask, and the components were heated to 120° C. using an oil bath and were dissolved and mixed. Subsequently, while the mixture was cooled to about 65° C., the Component (A) was added thereto, and the mixture was stirred and mixed, followed by cooling to about 65° C. The curing agent master batch was added thereto, and the resulting mixture was stirred and mixed. Thus, an epoxy resin composition was obtained.

A resin plate, a prepreg, and a fiber-reinforced composite material plate were produced using the epoxy resin composition thus obtained, according to the <Method 1 for producing epoxy resin plate>, <Method 1 for producing prepreg>, and <Method 1 for producing fiber-reinforced composite material plate>, which will be described below. Also, various measurements and evaluations were performed according to the <Evaluation methods> that will be described below. The results are presented in Table 2.

Examples 2 to 5 and Comparative Examples 1 to 5

Epoxy resin compositions were prepared in the same manner as in Example 1, except that the blend composition was changed as indicated in Tables 2 and 3. Resin plates, prepregs, and fiber-reinforced composite material plates were produced, and various measurements and evaluations were performed. The results are presented in Tables 2 and 3.

Example 6

An epoxy resin composition was prepared as follows, using OP935 as Component (A), jER828 and EPON165 as Components (B), DICY15 as Component (C), OMICURE94 as Component (D), PN-50 as Component (E), VINYLEC E as Component (F), and C-301N as Component (G).

First, the Component (B) (liquid), the Component (C) (solid), the Component (D) (solid), and the Component (E) were weighed in a vessel according to the composition described in Table 4, such that the mass ratio of the solid components and the liquid components would be 1:1, and the components were stirred and mixed. This mixture was further mixed thoroughly with a three-roll mill, and a curing agent master batch was obtained.

Separately, the Component (B) (liquid) and the Component (F) (solid) were weighed in a flask according to the composition described in Table 4, such that the mass ratio would be 9:1, and the components were heated to 120° C. using an oil bath and were dissolved and mixed. Thus, a thermoplastic master batch was obtained.

Subsequently, components other than the Component (A), the Component (G), and the components of the curing agent master batch in the composition described in Table 4 were weighed in a flask, and the components were heated to 120° C. using an oil bath and were dissolved and mixed. Subsequently, while the mixture was cooled to about 65° C. the Component (A) and the Component (G) were added thereto, and the mixture was stirred and mixed and was cooled to about 65° C. The curing agent master batch was added thereto, and the mixture was stirred and mixed. Thus, an epoxy resin composition was obtained.

A resin plate, a prepreg, and a fiber-reinforced composite material plate were produced using the epoxy resin composition thus obtained, according to the <Method 2 for producing epoxy resin plate>, <Method 2 for producing prepreg>, and <Method 2 for producing fiber-reinforced composite material plate>, which will be described below. Also, various measurements and evaluations were performed according to the <Evaluation methods> that will be described below. The results are presented in Table 4.

Examples 7 and 8, and Comparative Examples 6 to 8

Epoxy resin compositions were prepared in the same manner as in Example 6, except that the blend composition was changed as indicated in Tables 4 and 5. Resin plates, prepregs, and fiber-reinforced composite material plates were produced, and various measurements and evaluations were performed. The results are presented in Tables 4 and 5.

Examples 9 to 12

Epoxy resin compositions were prepared in the same manner as in Example 1, except that the mixing proportions were changed as indicated in Table 6. Resin plates and prepregs were produced, and various measurements and evaluations were performed. The results are presented in Table 6.

<Method 1 for Producing Epoxy Resin Plate>

A resin plate having a thickness of 2 mm was produced by curing an uncured epoxy resin composition in an oven atmosphere under the conditions of a temperature 150° C.×10 minutes (rate of temperature increase was 10° C./min).

<Method 2 for Producing Epoxy Resin Plate>

A resin plate having a thickness of 2 mm was produced by curing an uncured epoxy resin composition in an oven atmosphere under the conditions of a temperature of 150° C.×20 minutes (rate of temperature increase was 10° C./min).

<Method 1 for Producing Prepreg>

An uncured epoxy resin composition was produced into a film form using a comma coater (manufactured by HIRANO TECSEED Co., Ltd., "M-500"), and a resin film having a resin mass per unit area of 26.8 g/m² was produced. This resin film was laminated on both surfaces of a carbon fiber sheet having a fiber mass per unit area of 125 g/m², which was obtained by aligning carbon fibers, and the carbon fiber sheet was impregnated with the resin film using a heated roll. Thus, a prepreg having a fiber mass per unit area of 125 g/m² and a resin content of 30% by mass was obtained.

<Method 2 for Producing Prepreg>

An uncured epoxy resin composition was produced into a film form using a comma coater (manufactured by HIRANO TECSEED Co., Ltd., "M-500"), and a resin film having a resin mass per unit area of 84.4 g/m² was produced. This resin film was laminated on both surfaces of a carbon fiber sheet having a fiber mass per unit area of 300 g/m², which was obtained by aligning carbon fibers, and the carbon fiber sheet was impregnated with the resin film using a heated roll. Thus, a prepreg having a fiber mass per unit area of 300 g/m² and a resin content of 36% by mass was obtained.

<Method 1 for Producing Fiber-Reinforced Composite Material Plate>

The prepreg obtained by the <Method 1 for producing prepreg> was cut into a size of 298 mm×298 mm, and 10 sheets thereof were stacked up such that the fiber directions would be [0°/90°/0°/90°/0°/0°/90°/0°/90°/0°]. Thus, a laminate was obtained. This laminate was introduced into a mold for press forming that had been preheated to 150° C. in advance, and was press formed under the conditions of 150° C.×10 minutes and a pressure of 10 MPa. Thus, a fiber-reinforced composite material plate having a thickness of 1.1 mm ([0°/90°/0°/90°/0°/0°/90°/0°/90°/0°]) was obtained.

<Method 2 for Producing Fiber-Reinforced Composite Material Plate>

The prepreg obtained by the <Method 2 for producing prepreg> was cut into a size of 320 mm×320 mm, and three sheets thereof were stacked up such that the fiber directions would be [0°]3. Thus, a laminate was obtained. This laminate was introduced into an autoclave and was formed under the conditions of a rate of temperature increase of 10° C./min, 150° C.×20 minutes, and a pressure of 0.6 MPa. Thus, a fiber-reinforced composite material plate having a thickness of 0.9 mm ([0°]3) was obtained.

<Evaluation Methods>

(1) Measurement of Glass Transition Temperature of Epoxy Resin Composition by Differential Scanning Calorimetry (DSC)

The glass transition temperature (Tg) of an uncured epoxy resin composition was measured in a nitrogen atmosphere using a differential scanning calorimeter (DSC) (manufactured by TA Instruments Japan, Inc., "Q-1000"). The rate of temperature increase was set to 10° C./min, and the measurement temperature range was set to the range of from −20° C. to 50° C. Based on the method described in JIS K 7121, an intermediate point of a part in which the DSC curve exhibited a step-like change was designated as Tg (Tg before standing) of the epoxy resin composition. As the Tg of the epoxy resin composition is lower, a prepreg having adequate tackiness and shape retaining properties is obtained, and therefore, workability at the time of forming the fiber-reinforced composite material is improved. Thus, the glass transition temperature Tg is preferably, for example, 15° C. or lower.

(2) Calculation of Degree of Cure and Curing Time for Epoxy Resin Composition by Isothermal DSC Measurement The calorific value at the time of a curing reaction of an uncured epoxy resin composition was measured by isothermal DSC, and the degree of cure and the curing time were evaluated.

FIG. 1 schematically illustrates an example of a heat flow curve 1 for curing heat generation at a constant temperature. In regard to the temperature curve 3 in the cell, the intersection point between the extensions of an approximation straight line for the temperature curve in the temperature elevation process and an approximation straight line for the temperature curve in the isothermal process, is designated as the initiation point of isothermal retention time, t0. The area surrounded by an arbitrary baseline 2 and the heat flow curve 1 represents heat generation caused by a curing reaction, and it is said that heat generation is initiated (initiation of curing reaction) at time ts, and heat generation is completed (completion of curing reaction) at time te. The degree of cure αi at a time ti in the middle of curing can be determined by the following Expression (2), as a ratio of the calorific value ΔHi obtainable from the initiation point of curing reaction, ts, to the time, ti, with respect to the total calorific value ΔHtotal. Meanwhile, the calorific value ΔHi is determined by the trapezoid rule of sectional measurement. Also, the time taken to reach to the degree of cure αi is defined as the time starting from the initiation of isothermal retention time, t0.

$$\alpha_i = \frac{\Delta H_i}{\Delta H_{total}} \quad (2)$$

On the occasion of determining the degrees of cure and the time to reach various degrees of cure from the heat flow curve 1 of DSC thus measured, the various times were defined as follows.

The curing reaction completion time te was defined as the time ti at which the heat flow value was 1/1000 of the peak top value in the heat flow curve 1. The baseline 2 was defined as a line drawn horizontally from the heat flow at the curing reaction completion time te. In regard to the range of t0≥0, the time at which the baseline 2 and the heat flow curve 1 intersected each other for the first time was designated as the curing reaction initiation time ts. In the time section between ts and te, ΔHtotal and ΔHi at any arbitrary time ti were determined, and thus the degree of cure αi was determined by the Expression (2) given above.

The heat flow curve 1 was obtained using a differential scanning calorimeter (DSC) (manufactured by TA Instruments Japan, Inc., "Q-1000") by dispensing about 10 mg of a resin composition on an aluminum hermetic pan, disposing the sample on the sample stand in the cell, disposing a blank aluminum hermetic pan on the reference stand as a reference, heating the pans from 20° C. to 150° C. at a rate of temperature increase of 200° C./min, and maintaining the pans at 150° C. for 50 minutes as the retention time. The sampling rate of heat flow was set to 0.1 minutes. A sample which took a curing time of 10 minutes or less at the degree of cure of 90%, a sample which took a curing time of 15 minutes or less at the degree of cure of 95%, a sample which took a curing time of 18 minutes or less at the degree of cure of 98%, and a sample which took a curing time of 20 minutes or less at the degree of cure of 100% were considered acceptable.

(3) Measurement of DMA G'-Tg (Measurement of Tg of Resin Plate)

A resin plate having a thickness of 2 mm that was obtained by the Method 1 or 2 for producing epoxy resin plate was processed into a size of 55 mm in length and 12.7 mm in width, and the resultant was used as a specimen. For this specimen, the storage modulus G' was logarithmically plotted against temperature using a rheometer (manufactured by TA Instruments Japan, Inc., "ARES-RDS") at a measurement frequency of 1 Hz and a rate of temperature increase of 5° C./min, and the temperature determined from the intersection point between an approximation straight line for the plateau region of log G' and an approximation straight line for the region where G' underwent transition was recorded as DMA G'-Tg. This was designated as Tg of the resin plate. As the value of DMA G'-Tg is higher, it means that the resin plate has superior heat resistance.

(4) UL-94V Combustion Test for Resin Plate

A resin plate having a thickness of 2 mm that was obtained by the Method 1 or 2 for producing epoxy resin plate was processed into a size of 127 mm in length and 12.7 mm in width, and the resultant was used as a specimen. For this specimen, a combustion test was performed according to the standards of UL-94V using a combustion testing machine (manufactured by Suga Test Instruments Co., Ltd.). Specifically, a specimen was vertically set up with clamps and was brought into contact with a 20-mm flame for 10 seconds, and thus the combustion time was measured. The combustion test was performed for 5 specimens, and the number of samples that burned to the clamps, the maximum value (max) among the various combustion times, and the sum of the five values of combustion time (total combustion time: total) were recorded. Also, determination on [V-0, V-1, V-2, or fail] was made based on the results. Level V-0 represents the best flame retardancy, and flame retardancy becomes poorer in the order of V-1, V-2, and fail.

(5) Evaluation of Bending Characteristics of Resin Plate

A resin plate having a thickness of 2 mm that was obtained by the Method 1 or 2 for producing epoxy resin plate was processed into a size of 60 mm in length and 8 mm in width, and the resultant was used as a specimen. For this specimen, the bending characteristics (flexural strength, flexural modulus, elongation under maximum load (bending strain), and elongation at rupture (rupture strain)) were measured using a universal testing machine (manufactured by Instron Corp.) equipped with a three-point bending fixture (indenter and supports were all 3.2 mm R, and the distance between supports was 32 mm), under the condition of a cross-head speed of 2 mm/min.

(6) UL-94V Combustion Test for Fiber-Reinforced Composite Material Plate

A fiber-reinforced composite material plate having a thickness of 1.1 mm or 0.9 mm that was obtained by the Method 1 or 2 for producing a fiber-reinforced composite material plate was processed into a size of 127 mm in length and 12.7 mm in width, and the resultant was used as a specimen. For this specimen, a combustion test was performed in the same manner as in section (4). The combustion test was performed for 5 specimens, and the number of samples that burned to the clamps, the maximum value (max) among the various combustion times, and the sum of the five values of combustion time (total combustion time: total) were recorded. Also, determination on [V-0, V-1, V-2, or fail] was made based on the results.

(7) FAR Combustion Test for Fiber-Reinforced Composite Material Plate

A fiber-reinforced composite material plate ([0°]3) having a thickness of 0.9 mm that was obtained by the Method 2 for producing fiber-reinforced composite material plate was processed into a size of 150 mm in length and 150 mm in width, and the resultant was used as a specimen. For this specimen, a combustion test was performed according to the standards of FAR 25.853 Appendix F, Part IV. Specifically, the specimen was heated using a radiant heat source at 3.5 W/cm$^2$ in an apparatus through which air was caused to pass at a rate of 0.04 m$^3$/s, and the heat release rate was measured. The maximum value (peak heat release) for 5 minutes and the integral value (total heat release) for 2 minutes were calculated. Furthermore, determination on [Pass or Fail] was made based on the results. Pass represents that both the values of the peak heat release and the total heat release are 65 or less, and Fail represents that at least one of the peak heat release and the total heat release has a value of more than 65. As the peak heat release and the total heat release are smaller, it means that the fiber-reinforced composite material plate has superior flame retardancy.

TABLE 2

|  |  |  | Example 1 | Example 2 | Example 3 | Example 4 | Example 5 |
|---|---|---|---|---|---|---|---|
| Epoxy resin composition | Component (A) [parts by mass] | Exolit OP935 | 9 | 9 | 9 | 9 | 9 |
|  | Component (B) [parts by mass] | jER828 | 60 | 60 | 60 | 60 | 60 |
|  |  | Epon165 | 40 | 40 | 40 | 40 | 40 |
|  | Component (C) [parts by mass] | DICY15 | 8 | 8 | 8 | 8 | 8 |
|  | Component (D) [parts by mass] | Omicure24 | 12 | 0 | 0 | 0 | 0 |
|  |  | MDU-11 | 0 | 15.5 | 0 | 0 | 0 |
|  |  | Omicure94 | 0 | 0 | 15 | 8 | 8 |
|  | Component (E) [parts by mass] | PN-50 | 0 | 0 | 0 | 5 | 0 |
|  |  | TIC-188 | 0 | 0 | 0 | 0 | 4.2 |
|  |  | 2E4MZ | 0 | 0 | 0 | 0 | 0 |
|  | Component (F) [parts by mass] | VINYLEC E | 0 | 0 | 0 | 0 | 0 |
|  | Component (G) [parts by mass] | C-301N | 0 | 0 | 0 | 0 | 0 |
|  | Phosphorus atom content [mass %] |  | 1.6 | 1.56 | 1.57 | 1.59 | 1.6 |
|  | Content of Component (G) [mass %] |  | 0 | 0 | 0 | 0 | 0 |
|  | Active hydrogen equivalent ratio |  | 0.75 | 0.75 | 0.75 | 0.75 | 0.75 |
|  | Urea equivalent ratio |  | 0.18 | 0.18 | 0.18 | 0.1 | 0.1 |

TABLE 2-continued

|  |  |  | Example 1 | Example 2 | Example 3 | Example 4 | Example 5 |
|---|---|---|---|---|---|---|---|
| Epoxy resin composition | Tg before standing [° C.] |  | 1.1 | 0.3 | −2.5 | −2.3 | −2.2 |
|  | Isothermal DSC | Curing time [min] at degree of cure of 90% | 2.1 | 2.9 | 3.3 | 4.8 | 4.4 |
|  |  | Curing time [min] at degree of cure of 95% | 2.6 | 3.3 | 3.9 | 5.9 | 5.1 |
|  |  | Curing time [min] at degree of cure of 98% | 3.4 | 4.1 | 4.8 | 7.3 | 6.2 |
|  |  | Curing time [min] at degree of cure of 100% | 6.3 | 7.2 | 7.9 | 10.6 | 9.3 |
| Resin plate | Tg [° C.] |  | — | 144.2 | — | 149.6 | 149.7 |
|  | UL-94V combustion test | max [sec] | 12 | 7 | — | 17 | — |
|  |  | total [sec] | 61 | 41 | — | 73 | — |
|  |  | Determination | V-1 | V-0 | — | V-1 | — |
|  | Bending characteristics | Flexural strength [MPa] | 93.3 | 128.5 | 107.3 | 118.4 | 157.9 |
|  |  | Flexural modulus [GPa] | 3.65 | 4.03 | 4.21 | 3.81 | 4.21 |
|  |  | Bending strain [%] | 2.7 | 3.56 | 2.61 | 3.34 | 4.53 |
|  |  | Rupture strain [%] | 2.7 | 3.56 | 2.62 | 3.34 | 4.54 |
| Fiber-reinforced composite material plate | UL-94V combustion test | max [sec] | — | — | 24 | — | 20 |
|  |  | total [sec] | — | — | 104 | — | 90 |
|  |  | Determination | — | — | V-1 | — | V-1 |

TABLE 3

|  |  |  | Comparative Example 1 | Comparative Example 2 | Comparative Example 3 | Comparative Example 4 | Comparative Example 5 |
|---|---|---|---|---|---|---|---|
| Epoxy resin composition | Component (A) [parts by mass] | Exolit OP935 | 9 | 9 | 9 | 9 | 8 |
|  | Component (B) [parts by mass] | jER828 | 60 | 60 | 60 | 60 | 60 |
|  |  | Epon165 | 40 | 40 | 40 | 40 | 40 |
|  | Component (C) [parts by mass] | DICY15 | 8 | 8 | 0 | 0 | 8 |
|  | Component (D) [parts by mass] | Omicure24 | 0 | 0 | 0 | 0 | 0 |
|  |  | MDU-11 | 0 | 0 | 0 | 0 | 0 |
|  |  | Omicure94 | 0 | 0 | 8 | 8 | 0 |
|  | Component (E) [parts by mass] | PN-50 | 5 | 0 | 5 | 0 | 0 |
|  |  | TIC-188 | 0 | 4.2 | 0 | 4.2 | 0 |
|  |  | 2E4MZ | 0 | 0 | 0 | 0 | 2.2 |
|  | Component (F) [parts by mass] | VINYLEC E | 0 | 0 | 0 | 0 | 0 |
|  | Component (G) [parts by mass] | C-301N | 0 | 0 | 0 | 0 | 0 |
|  | Phosphorus atom content [mass %] |  | 1.7 | 1.71 | 1.7 | 1.71 | 1.59 |
|  | Content of Component (G) [mass %] |  | 0 | 0 | 0 | 0 | 0 |
|  | Active hydrogen equivalent ratio |  | 0.75 | 0.75 | 0 | 0 | 0.75 |
|  | Urea equivalent ratio |  | 0 | 0 | 0.1 | 0.1 | 0 |
| Epoxy resin composition | Tg before standing [° C.] |  | −0.1 | 0.1 | −1.8 | — | 15 |
|  | Isothermal DSC | Curing time [min] at degree of cure of 90% | 16.9 | 20.0 | 10.5 | 12.6 | 9.5 |
|  |  | Curing time [min] at degree of cure of 95% | 19.5 | 21.5 | 12.7 | 15.0 | 11.2 |
|  |  | Curing time [min] at degree of cure of 98% | 22.3 | 23.0 | 14.9 | 17.5 | 13 |
|  |  | Curing time [min] at degree of cure of 100% | 27.8 | 25.7 | 19.8 | 22.5 | 16.8 |
| Resin plate | Tg [° C.] |  | 109.1 | 69 | 112.5 | 122.6 | — |
|  | UL-94V combustion test | max [sec] | 9 | — | 11 | 18 | 29 |
|  |  | total [sec] | 50 | — | 53 | 91 | 129 |
|  |  | Determination | V-0 | — | V-1 | V-1 | V-1 |
|  | Bending characteristics | Flexural strength [MPa] | 82.3 | — | 138.8 | 140.2 | 139.8 |
|  |  | Flexural modulus [GPa] | 3.87 | — | 4.11 | 3.72 | 3.62 |
|  |  | Bending strain [%] | 2.14 | — | 3.97 | 4.82 | 5.72 |
|  |  | Rupture strain [%] | 2.15 | — | 3.98 | 4.82 | 5.73 |

TABLE 4

| | | | Example 6 | Example 7 | Example 8 |
|---|---|---|---|---|---|
| Epoxy resin composition | Component (A) [parts by mass] | Exolit OP935 | 9 | 16 | 9 |
| | Component (B) [parts by mass] | jER828 | 75 | 75 | 75 |
| | | Epon165 | 25 | 25 | 25 |
| | Component (C) [parts by mass] | DICY15 | 8 | 8 | 8 |
| | Component (D) [parts by mass] | Omicure24 | 0 | 0 | 0 |
| | | MDU-11 | 0 | 0 | 0 |
| | | Omicure94 | 5 | 5 | 5 |
| | Component (E) [parts by mass] | PN-50 | 10 | 10 | 10 |
| | | TIC-188 | 0 | 0 | 0 |
| | | 2E4MZ | 0 | 0 | 0 |
| | Component (F) [parts by mass] | VINYLEC E | 3 | 3 | 3 |
| | Component (G) [parts by mass] | C-301N | 73 | 20.5 | 0 |
| | Phosphorus atom content [mass %] | | 1.53 | 2.59 | 1.53 |
| | Content of Component (G) [mass %] | | 35.1 | 12.6 | 0 |
| | Active hydrogen equivalent ratio | | 0.73 | 0.73 | 0.73 |
| | Urea equivalent ratio | | 0.06 | 0.06 | 0.06 |
| | Fittability to Expression (1) | | ○ | X | X |
| Epoxy resin composition | Tg before standing [° C.] | | −6.7 | −6.4 | −5.6 |
| | Isothermal DSC | Curing time [min] at degree of cure of 90% | 3.4 | 5.5 | 3.6 |
| | | Curing time [min] at degree of cure of 95% | 4.2 | 6.7 | 4.5 |
| | | Curing time [min] at degree of cure of 98% | 5.2 | 8.1 | 5.8 |
| | | Curing time [min] at degree of cure of 100% | 7.7 | 11.2 | 9.1 |
| Resin plate | Bending characteristics | Flexural strength [MPa] | 116.1 | 112.8 | 131.6 |
| | | Flexural modulus [GPa] | 5.65 | 3.91 | 3.6 |
| | | Bending strain [%] | 2.25 | 3.29 | 4.38 |
| | | Rupture strain [%] | 2.25 | 3.3 | 4.38 |
| Fiber-reinforced composite material plate | UL-94V combustion test | max [sec] | 14 | 18 | 20 |
| | | total [sec] | 88 | 96 | 88 |
| | | Determination | V-1 | V-1 | V-1 |
| | FAR combustion test | Total [kW · min/m$^2$] | 59.2 | 69.6 | — |
| | | Peak [kW/m$^2$] | 47 | 57.4 | — |
| | | Determination | Pass | Fail | — |

TABLE 5

| | | | Comparative Example 6 | Comparative Example 7 | Comparative Example 8 |
|---|---|---|---|---|---|
| Epoxy resin composition | Component (A) [parts by mass] | Exolit OP935 | 0 | 0 | 0 |
| | Component (B) [parts by mass] | jER828 | 75 | 75 | 75 |
| | | Epon165 | 25 | 25 | 25 |
| | Component (C) [parts by mass] | DICY15 | 8 | 8 | 8 |
| | Component (D) [parts by mass] | Omicure24 | 0 | 0 | 0 |
| | | MDU-11 | 0 | 0 | 0 |
| | | Omicure94 | 5 | 5 | 5 |
| | Component (E) [parts by mass] | PN-50 | 10 | 10 | 10 |
| | | TIC-188 | 0 | 0 | 0 |
| | | 2E4MZ | 0 | 0 | 0 |
| | Component (F) [parts by mass] | VINYLEC E | 3 | 3 | 3 |
| | Component (G) [parts by mass] | C-301N | 0 | 68 | 98 |
| | Phosphorus atom content [mass %] | | 0 | 0 | 0 |
| | Content of Component (G) [mass %] | | 0 | 35.1 | 43.8 |
| | Active hydrogen equivalent ratio | | 0.73 | 0.73 | 0.73 |
| | Urea equivalent ratio | | 0.06 | 0.06 | 0.06 |
| | Fittability to Expression (1) | | X | X | X |

TABLE 5-continued

|  |  |  | Comparative Example 6 | Comparative Example 7 | Comparative Example 8 |
|---|---|---|---|---|---|
| Epoxy resin composition | Tg before standing [° C.] |  | −5.5 | −5.6 | −5.4 |
|  | Isothermal DSC | Curing time [min] at degree of cure of 90% | 1.6 | 1.8 | 1.8 |
|  |  | Curing time [min] at degree of cure of 95% | 2.2 | 2.3 | 2.3 |
|  |  | Curing time [min] at degree of cure of 98% | 2.9 | 3 | 3 |
|  |  | Curing time [min] at degree of cure of 100% | 5.6 | 5.1 | 5.1 |
| Resin plate | UL-94V combustion test | max [sec] | >30 | >30 | >30 |
|  |  | total [sec] | — | — | — |
|  |  | Determination | Fail | Fail | Fail |
|  | Bending characteristics | Flexural strength [MPa] | 144.5 | 135.3 | 125.1 |
|  |  | Flexural modulus [GPa] | 3.63 | 5.79 | 7 |
|  |  | Bending strain [%] | 4.64 | 2.59 | 1.96 |
|  |  | Rupture strain [%] | 4.65 | 2.59 | 1.96 |
| Fiber-reinforced composite material plate | UL-94V combustion test | max [sec] | — | — | 16 |
|  |  | total [sec] | — | — | 77 |
|  |  | Determination | — | — | V-1 |

TABLE 6

|  |  |  | Example 9 | Example 10 | Example 11 | Example 12 |
|---|---|---|---|---|---|---|
| Epoxy resin composition | Component (A) [parts by mass] | Exolit OP935 | 9 | 9 | 9 | 9 |
|  | Component (B) [parts by mass] | jER828 | 60 | 60 | 60 | 60 |
|  |  | Epon165 | 40 | 40 | 40 | 40 |
|  | Component (C) [parts by mass] | DICY15 | 8 | 8 | 8 | 8 |
|  | Component (D) [parts by mass] | Omicure24 | 0 | 0 | 0 | 0 |
|  |  | MDU-11 | 0 | 0 | 0 | 0 |
|  |  | Omicure94 | 8 | 8 | 8 | 8 |
|  | Component (E) [parts by mass] | 2MZA-PW | 5 | 0 | 0 | 0 |
|  |  | 2PZCNS-PW | 0 | 5 | 0 | 0 |
|  |  | 2PHZ-PW | 0 | 0 | 5 | 0 |
|  |  | 2P4MHZ-PW | 0 | 0 | 0 | 5 |
|  |  | 2E4MZ | 0 | 0 | 0 | 0 |
|  | Component (F) [parts by mass] | PVF | 0 | 0 | 0 | 0 |
|  | Component (G) [parts by mass] | C-301N | 0 | 0 | 0 | 0 |
|  | Phosphorus atom content [mass %] |  | 1.59 | 1.59 | 1.59 | 1.59 |
|  | Content of Component (G) [mass %] |  | 0.0 | 0.0 | 0.0 | 0.0 |
|  | Active hydrogen equivalent ratio |  | 0.75 | 0.75 | 0.75 | 0.75 |
|  | Urea equivalent ratio |  | 0.10 | 0.10 | 0.10 | 0.10 |
| Epoxy resin composition | Tg before standing [° C.] |  | −3.3 | −2.7 | −3.3 | −3.1 |
|  | Isothermal DSC | Curing time [min] at degree of cure of 90% | 2.8 | 3.6 | 4.6 | 4.2 |
|  |  | Curing time [min] at degree of cure of 95% | 4.1 | 5.0 | 6.5 | 6.3 |
|  |  | Curing time [min] at degree of cure of 98% | 6.3 | 7.4 | 9.6 | 9.6 |
|  |  | Curing time [min] at degree of cure of 100% | 9.1 | 10.3 | 14.1 | 15.4 |
| Resin plate | Tg [° C.] |  | 144.9 | 142.1 | 149.1 | 150.5 |
|  | UL-94V combustion test | max [sec] | 11 | 25 | 23 | 21 |
|  |  | total [sec] | 49 | 86 | 82 | 77 |
|  |  | Determination | V-1 | V-1 | V-1 | V-1 |
|  | Bending characteristics | Flexural strength [MPa] | 120.0 | 108.0 | 117.3 | 130.8 |
|  |  | Flexural modulus [GPa] | 4.31 | 4.01 | 4.20 | 4.05 |
|  |  | Bending strain [%] | 3.04 | 2.80 | 2.96 | 3.56 |
|  |  | Rupture strain [%] | 3.04 | 2.80 | 2.96 | 3.56 |

In the tables, the "phosphorus atom content (mass %)" represents the phosphorus atom content (mass %) in 100% by mass of the epoxy resin composition excluding the Component (G). The "content of Component (G) (mass %)" represents the content (mass %) of the Component (G) in 100% by mass of the epoxy resin composition including the Component (G). Furthermore, the "active hydrogen equivalent ratio" represents the amount (mol) of active hydrogen in the Component (C) with respect to 1 molar equivalent of epoxy groups in the epoxy resin composition. The "urea equivalent ratio" represents the ratio of the amount (mol) of urea groups in the Component (D) with respect to 1 molar equivalent of epoxy groups in the epoxy resin composition.

As is obvious from the results of Tables 2 and 3, the epoxy resin compositions of Examples 1 to 5 had excellent curability, and also had excellent thermal stability because a phenomenon in which viscosity increased during resin preparation was not observed. Furthermore, the resin plates produced using these epoxy resin compositions had high Tg values and excellent heat resistance. These resin plates had excellent flame retardancy and bending characteristics. Particularly, in the case of Examples 4 and 5 in which the epoxy resin composition included Component (E), it was found that the bending characteristics (particularly flexural strength, bending strain, and rupture strain) of the resin plates were superior compared to Example 3. This is speculated to be because the epoxy groups of the Component (B) or the Component (C) was further activated by the Component (E).

On the other hand, the epoxy resin composition of Comparative Example 1 that did not include the Component (D) exhibited a slow curing rate. Furthermore, the resin plate obtained in Comparative Example 1 exhibited excellent flame retardancy, but had poor bending characteristics.

The epoxy resin composition of Comparative Example 2 that did not include the Component (D) exhibited even a slower curing rate than Comparative Example 1, satisfactory effects were not obtained, and the cured product became brittle. Thus, a resin plate or a fiber-reinforced composite material plate, with which flame retardancy and bending characteristics could be evaluated, could not be produced.

The epoxy resin compositions of Comparative Examples 3 and 4 that did not include the Component (C) exhibited slow curing rates.

The epoxy resin composition of Comparative Example 5 that did not include the Component (D) exhibited a slow curing rate. Furthermore, as the viscosity increased during resin preparation, thermal stability became poorer, and the Tg of the epoxy resin composition was quite high compared to Examples 1 to 5 and Comparative Examples 1 to 3.

As is obvious from the results of Tables 4 and 5, the epoxy resin compositions of Examples 6 to 8 had excellent curability, and also had excellent thermal stability because a phenomenon in which viscosity increased during resin preparation was not observed. Furthermore, the resin plates and fiber-reinforced composite material plates produced using these epoxy resin compositions exhibited excellent flame retardancy and bending characteristics. Particularly, in the case of Example 6 in which the epoxy resin composition included 35.1% by mass of the Component (G), and the phosphorus atom content (x) and the content of the Component (G) (y) satisfied the Expression (1), both the peak heat release and the total heat release were 65 or less, and superior flame retardancy was obtained.

On the other hand, the resin plates obtained using the epoxy resin compositions of Comparative Examples 6 to 8 that did not include the Component (A) exhibited inferior flame retardancy.

Examples 13 to 39

Epoxy resin compositions were produced in the same manner as in Example 1 or 6, except that the materials and mixing proportions were changed as described in Tables 7 to 10, and resin plates, prepregs, and fiber-reinforced composite materials were produced therefrom. Various measurements and evaluations were performed. The results are presented in Tables 7 to 10.

TABLE 7

| | | | Example 13 | Example 14 | Example 15 | Example 16 | Example 17 | Example 18 |
|---|---|---|---|---|---|---|---|---|
| Epoxy resin composition | Component (A) [parts by mass] | Exolit OP935 | 0 | 0 | 9 | 9 | 9 | 9 |
| | | Exolit OP930 | 9 | 9 | 0 | 0 | 0 | 0 |
| | Component (B) [parts by mass] | jER828 | 60 | 60 | 60 | 60 | 60 | 60 |
| | | Epon165 | 40 | 40 | 40 | 40 | 40 | 40 |
| | | Tactix742 | 0 | 0 | 0 | 0 | 0 | 0 |
| | Component (C) [parts by mass] | DICY15 | 8 | 8 | 8 | 8 | 8 | 8 |
| | Component (D) [parts by mass] | Omicure24 | 0 | 0 | 0 | 0 | 0 | 0 |
| | | MDU-11 | 0 | 0 | 0 | 0 | 0 | 0 |
| | | Omicure94 | 8 | 8 | 8 | 8 | 8 | 8 |
| | Component (E) [parts by mass] | PN-50 | 5 | 0 | 0 | 0 | 0 | 0 |
| | | TIC-188 | 0 | 4.2 | 0 | 0 | 0 | 0 |
| | | PN-H | 0 | 0 | 5 | 0 | 0 | 0 |
| | | PN-23 | 0 | 0 | 0 | 5 | 0 | 0 |
| | | PN-31 | 0 | 0 | 0 | 0 | 5 | 0 |
| | | PN-40 | 0 | 0 | 0 | 0 | 0 | 5 |
| | Component (F) [parts by mass] | PVF | 0 | 0 | 0 | 0 | 0 | 0 |
| | | YP-70 | 0 | 0 | 0 | 0 | 0 | 0 |
| | Component (G) [parts by mass] | C-301N | 0 | 0 | 0 | 0 | 0 | 0 |
| | Phosphorus atom content [mass %] | | 1.59 | 1.60 | 1.59 | 1.59 | 1.59 | 1.59 |
| | Content of Component (G) [mass %] | | 0.0 | 0.0 | 0.0 | 0.0 | 0.0 | 0.0 |
| | Active hydrogen equivalent ratio | | 0.75 | 0.75 | 0.75 | 0.75 | 0.75 | 0.75 |
| | Urea equivalent ratio | | 0.10 | 0.10 | 0.10 | 0.10 | 0.10 | 0.10 |
| Epoxy resin composition | Tg before standing [° C.] | | −2.9 | −3.1 | −1.7 | 0.7 | −2.5 | −2.2 |
| | Isothermal DSC | Curing time [min] at degree of cure of 90% | 4.0 | 4.5 | 2.8 | 2.9 | 2.8 | 3.3 |
| | | Curing time [min] at degree of cure of 95% | 5.8 | 6.4 | 3.5 | 3.5 | 3.4 | 4 |
| | | Curing time [min] at degree of cure of 98% | 8.3 | 8.9 | 4.2 | 4.3 | 4.2 | 4.8 |
| | | Curing time [min] at degree of cure of 100% | 13.3 | 12.1 | 6.0 | 6.2 | 6.2 | 6.7 |

TABLE 7-continued

|  |  | Example 13 | Example 14 | Example 15 | Example 16 | Example 17 | Example 18 |
|---|---|---|---|---|---|---|---|
| Resin plate | Resin plate Tg [° C.] | 148.9 | 149.9 | 149.4 | 149.2 | 148.6 | 149.5 |
|  | UL-94V combustion test max [sec] | 16 | 28 | 23 | 28 | 26 | 11 |
|  | total [sec] | 65 | 77 | 104 | 118 | 116 | 58 |
|  | Determination | V-1 | V-1 | V-1 | V-1 | V-1 | V-1 |

TABLE 8

|  |  |  | Example 19 | Example 20 | Example 21 | Example 22 | Example 23 | Example 24 | Example 25 |
|---|---|---|---|---|---|---|---|---|---|
| Epoxy resin composition | Component (A) [parts by mass] | Exolit OP935 | 9 | 9 | 9 | 9 | 9 | 9 | 9 |
|  |  | Exolit OP930 | 0 | 0 | 0 | 0 | 0 | 0 | 0 |
|  | Component (B) [parts by mass] | jER828 | 60 | 60 | 60 | 60 | 60 | 60 | 60 |
|  |  | jER807 | 0 | 0 | 0 | 0 | 0 | 0 | 0 |
|  |  | Epon165 | 40 | 40 | 40 | 40 | 40 | 40 | 40 |
|  |  | jER630 | 0 | 0 | 0 | 0 | 0 | 0 | 0 |
|  |  | Tactix742 | 0 | 0 | 0 | 0 | 0 | 0 | 0 |
|  | Component (C) [parts by mass] | DICY15 | 8 | 8 | 8 | 8 | 8 | 8 | 8 |
|  | Component (D) [parts by mass] | Omicure24 | 0 | 0 | 0 | 0 | 0 | 0 | 0 |
|  |  | MDU-11 | 0 | 0 | 0 | 0 | 0 | 0 | 0 |
|  |  | Omicure94 | 8 | 8 | 8 | 8 | 8 | 8 | 8 |
|  | Component (E) [parts by mass] | KM-188 | 4.2 | 0 | 0 | 0 | 0 | 0 | 0 |
|  |  | HIPA-2P4MHZ | 0 | 4 | 0 | 0 | 0 | 0 | 0 |
|  |  | NIPA-2P4MHZ | 0 | 0 | 3.2 | 0 | 0 | 0 | 0 |
|  |  | TEP-2E4MZ | 0 | 0 | 0 | 3.3 | 0 | 0 | 0 |
|  |  | HIPA-2E4MZ | 0 | 0 | 0 | 0 | 3.1 | 0 | 0 |
|  |  | NIPA-2E4MZ | 0 | 0 | 0 | 0 | 0 | 3.4 | 0 |
|  |  | 2P4MHZ-PW/L-07N | 0 | 0 | 0 | 0 | 0 | 0 | 2.0/2.0 |
|  | Component (F) [parts by mass] | PVF | 0 | 0 | 0 | 0 | 0 | 0 | 0 |
|  |  | YP-70 | 0 | 0 | 0 | 0 | 0 | 0 | 0 |
|  | Component (G) [parts by mass] | C-301N | 0 | 0 | 0 | 0 | 0 | 0 | 0 |
|  | Phosphorus atom content [mass %] |  | 1.60 | 1.60 | 1.61 | 1.61 | 1.62 | 1.61 | 1.66 |
|  | Content of Component (G) [mass %] |  | 0.0 | 0.0 | 0.0 | 0.0 | 0.0 | 0.0 | 0.0 |
|  | Active hydrogen equivalent ratio |  | 0.75 | 0.75 | 0.75 | 0.75 | 0.75 | 0.75 | 0.75 |
|  | Urea equivalent ratio |  | 0.10 | 0.10 | 0.10 | 0.10 | 0.10 | 0.10 | 0.10 |
|  | Fittability to Expression (1) |  | X | X | X | X | X | X | X |
| Epoxy resin composition | Tg before standing [° C.] |  | −3.0 | −2.6 | −3.9 | −1.8 | −3.4 | −2.9 | −4.0 |
|  | Isothermal DSC | Curing time [min] at degree of cure of 90% | 3.1 | 3.2 | 2.9 | 2.6 | 2.8 | 2.3 | 2.6 |
|  |  | Curing time [min] at degree of cure of 95% | 3.6 | 3.7 | 3.4 | 3.2 | 3.3 | 2.9 | 3.1 |
|  |  | Curing time [min] at degree of cure of 98% | 4.3 | 4.4 | 4.1 | 3.8 | 4.0 | 3.5 | 3.8 |
|  |  | Curing time [min] at degree of cure of 100% | 6.1 | 6.3 | 6.2 | 5.8 | 5.9 | 5.5 | 5.7 |
| Resin plate | Resin plate Tg [° C.] |  | 151.0 | 143.2 | 146.8 | 149.9 | 145.2 | 142.1 | 149.0 |
|  | UL-94V combustion test | max [sec] | 22 | 22 | 26 | 25 | 29 | 14 | 24 |
|  |  | total [sec] | 105 | 87 | 102 | 99 | 80 | 71 | 88 |
|  |  | Determination | V-1 | V-1 | V-1 | V-1 | V-1 | V-1 | V-1 |
|  | Bending characteristics | Flexural strength (MPa) | 155.8 | 134.0 | 124.5 | 157.4 | 119.9 | 115.7 | 142.3 |
|  |  | Flexural modulus (GPa) | 3.92 | 3.88 | 3.89 | 3.91 | 3.99 | 4.14 | 3.71 |
|  |  | Bending strain (%) | 4.87 | 3.76 | 3.42 | 5.22 | 3.19 | 2.91 | 4.55 |
|  |  | Rupture strain (%) | 4.88 | 3.77 | 3.42 | 5.22 | 3.19 | 2.91 | 4.55 |

TABLE 9

|  |  |  | Example 26 | Example 27 | Example 28 | Example 29 | Example 30 | Example 31 | Example 32 |
|---|---|---|---|---|---|---|---|---|---|
| Epoxy resin composition | Component (A) [parts by mass] | Exolit OP935 | 3 | 3 | 3 | 3 | 9 | 9 | 9 |
|  |  | Exolit OP930 | 0 | 0 | 0 | 0 | 0 | 0 | 0 |
|  | Component (B) [parts by mass] | jER828 | 75 | 75 | 75 | 75 | 75 | 75 | 75 |
|  |  | jER807 | 0 | 0 | 0 | 0 | 0 | 0 | 0 |
|  |  | Epon165 | 25 | 25 | 25 | 25 | 25 | 25 | 25 |
|  |  | jER630 | 0 | 0 | 0 | 0 | 0 | 0 | 0 |
|  |  | Tactix742 | 0 | 0 | 0 | 0 | 0 | 0 | 0 |
|  | Component (C) [parts by mass] | DICY15 | 8 | 8 | 8 | 8 | 8 | 8 | 8 |

TABLE 9-continued

| | | | Example 26 | Example 27 | Example 28 | Example 29 | Example 30 | Example 31 | Example 32 |
|---|---|---|---|---|---|---|---|---|---|
| | Component (D) [parts by mass] | Omicure24 | 0 | 0 | 0 | 0 | 0 | 0 | 0 |
| | | MDU-11 | 0 | 0 | 0 | 0 | 0 | 0 | 0 |
| | | Omicure94 | 5 | 5 | 5 | 5 | 5 | 5 | 5 |
| | Component (E) [parts by mass] | PN-50 | 10 | 10 | 10 | 10 | 10 | 10 | 10 |
| | | TIC-188 | 0 | 0 | 0 | 0 | 0 | 0 | 0 |
| | | 2E4MZ | 0 | 0 | 0 | 0 | 0 | 0 | 0 |
| | Component (F) [parts by mass] | PVF | 3 | 3 | 3 | 3 | 3 | 3 | 3 |
| | | YP-70 | 0 | 0 | 0 | 0 | 0 | 0 | 0 |
| | Component (G) [parts by mass] | C-301N | 70 | 78 | 87 | 100 | 52 | 58 | 66 |
| | Phosphorus atom content [mass %] | | 0.53 | 0.53 | 0.53 | 0.53 | 1.53 | 1.53 | 1.53 |
| | Content of Component (G) [mass %] | | 35.2 | 37.7 | 40.3 | 43.7 | 27.8 | 30.1 | 32.8 |
| | Active hydrogen equivalent ratio | | 0.73 | 0.73 | 0.73 | 0.73 | 0.73 | 0.73 | 0.73 |
| | Urea equivalent ratio | | 0.06 | 0.06 | 0.06 | 0.06 | 0.06 | 0.06 | 0.06 |
| | Fittability to Expression (1) | | X | ○ | ○ | ○ | X | X | X |
| Epoxy resin composition | Tg before standing [° C.] | | −7.3 | −7.0 | −6.7 | −6.6 | −6.6 | −6.3 | −6.0 |
| | Isothermal DSC | Curing time [min] at degree of cure of 90% | 2.2 | 2.1 | 2.2 | 2.1 | 4.2 | 4.0 | 3.9 |
| | | Curing time [min] at degree of cure of 95% | 2.7 | 2.6 | 2.6 | 2.7 | 5.0 | 4.7 | 4.7 |
| | | Curing time [min] at degree of cure of 98% | 3.2 | 3.2 | 3.2 | 3.4 | 5.9 | 5.6 | 5.6 |
| | | Curing time [min] at degree of cure of 100% | 4.7 | 4.5 | 4.5 | 5.6 | 7.9 | 7.9 | 7.9 |
| Resin plate | Resin plate Tg [° C.] | | — | — | — | 141 | — | — | — |
| | Bending characteristics | Flexural strength (MPa) | — | — | — | 119.1 | — | — | — |
| | | Flexural modulus (GPa) | — | — | — | 7.14 | — | — | — |
| | | Bending strain (%) | — | — | — | 1.77 | — | — | — |
| | | Rupture strain (%) | — | — | — | 1.78 | — | — | — |
| Fiber-reinforced composite material | UL-94V combustion test | max [sec] | 24 | — | — | — | 18 | 19 | 13 |
| | | total [sec] | 107 | — | — | — | 73 | 76 | 58 |
| | | Determination | V-1 | — | — | — | V-1 | V-1 | V-1 |
| | FAR combustion test | Total[kW · min/m$^2$] | 68.4 | 64.7 | 61.2 | 56.9 | 68.0 | 67.3 | 66.1 |
| | | Peak[kW/m$^2$] | 57.5 | 61.5 | 54.0 | 42.3 | 55.0 | 61.5 | 55.4 |
| | | Determination | Fail | Pass | Pass | Pass | Fail | Fail | Fail |

TABLE 10

| | | | Example 33 | Example 34 | Example 35 | Example 36 | Example 37 | Example 38 | Example 39 |
|---|---|---|---|---|---|---|---|---|---|
| Epoxy resin composition | Component (A) [parts by mass] | Exolit OP935 | 9 | 3 | 9 | 9 | 9 | 9.2 | 9 |
| | | Exolit OP930 | 0 | 0 | 0 | 0 | 0 | 0 | 0 |
| | Component (B) [parts by mass] | jER828 | 40 | 40 | 40 | 0 | 50 | 25 | 50 |
| | | jER807 | 0 | 0 | 0 | 40 | 0 | 0 | 0 |
| | | Epon165 | 0 | 0 | 0 | 0 | 0 | 25 | 50 |
| | | jER630 | 0 | 0 | 0 | 0 | 0 | 50 | 0 |
| | | Tactix742 | 60 | 60 | 60 | 60 | 50 | 0 | 0 |
| | Component (C) [parts by mass] | DICY15 | 9 | 9 | 9 | 9 | 9 | 11.5 | 8 |
| | Component (D) [parts by mass] | Omicure24 | 0 | 0 | 0 | 0 | 0 | 0 | 0 |
| | | MDU-11 | 0 | 0 | 0 | 0 | 0 | 0 | 0 |
| | | Omicure94 | 6 | 6 | 6 | 6 | 4 | 6 | 4 |
| | Component (E) [parts by mass] | PN-50 | 10 | 10 | 10 | 10 | 0 | 10 | 0 |
| | | TIC-188 | 0 | 0 | 0 | 0 | 0 | 0 | 0 |
| | | 2MZA-PW | 0 | 0 | 0 | 0 | 10 | 0 | 10 |
| | | 2E4MZ | 0 | 0 | 0 | 0 | 0 | 0 | 0 |
| | Component (F) [parts by mass] | PVF | 0 | 0 | 0 | 0 | 0 | 3 | 0 |
| | | YP-70 | 0 | 0 | 0 | 0 | 3 | 0 | 3 |
| | Component (G) [parts by mass] | C-301N | 73 | 106 | 110 | 73 | 74 | 76 | 74 |
| | Phosphorus atom content [mass %] | | 1.54 | 0.54 | 1.54 | 1.54 | 1.57 | 1.51 | 1.58 |
| | Content of Component (G) [mass %] | | 35.3 | 45.3 | 45.1 | 35.3 | 35.4 | 35.2 | 35.6 |
| | Active hydrogen equivalent ratio | | 0.72 | 0.72 | 0.72 | 0.70 | 0.74 | 0.72 | 1.41 |
| | Urea equivalent ratio | | 0.06 | 0.06 | 0.06 | 0.06 | 0.04 | 0.05 | 0.09 |
| | Fittability to Expression (1) | | ○ | ○ | ○ | ○ | ○ | ○ | ○ |
| Epoxy resin composition | Tg before standing [° C.] | | — | −0.6 | −1.5 | — | — | — | — |
| | Isothermal DSC | Curing time [min] at degree of cure of 90% | 2.3 | 1.3 | 2.1 | — | — | — | — |
| | | Curing time [min] at degree of cure of 95% | 2.6 | 1.5 | 2.5 | — | — | — | — |
| | | Curing time [min] at degree of cure of 98% | 3.0 | 1.8 | 2.8 | — | — | — | — |

TABLE 10-continued

|  |  |  | Example 33 | Example 34 | Example 35 | Example 36 | Example 37 | Example 38 | Example 39 |
|---|---|---|---|---|---|---|---|---|---|
|  |  | Curing time [min] at degree of cure of 100% | 3.9 | 2.3 | 3.6 | — | — | — | — |
| Fiber-reinforced composite material | FAR combustion test | Total[kW · min/m$^2$] | 52.1 | 51.3 | 47.9 | 56.9 | 52.5 | 51.5 | 52 |
|  |  | Peak[kW/m$^2$] | 52.8 | 47.6 | 38.9 | 56.9 | 48.1 | 50.7 | 42.2 |
|  |  | Determination | Pass | Pass | Pass | Pass | Pass | Pass | Pass |

<Evaluation of Shear Rate Sweep Measurement>

For the epoxy resin composition obtained in Example 4 and the epoxy resin compositions having the composition described in Table 11 (Comparative Examples 9 and 10), the shear rate dependency of viscosity was evaluated by the following method. The results are presented in Table 11. An epoxy resin composition including the Component (A) of the present invention as a flame retardant, exhibits a coefficient of determination of 0.98 or more in shear rate sweep measurement, and thus it is understood that the epoxy resin composition has excellent coatability.

(Evaluation Method)

An epoxy resin composition was sandwiched between parallel plates having a diameter of 25 mm, with the gap therebetween being adjusted to 500 μm, and the shear rate was increased from 0.01 (1/sec) to 1,000 (1/sec) at 60° C. using a viscometer (manufactured by TA Instruments Japan, Inc., "AR-G2"). Viscosity was index plotted against temperature at every second and was recorded. Linear approximation was performed at five hundred points from 500 (1/sec) to 1,000 (1/sec), and the coefficient of determination was calculated. When the coefficient of determination was 0.98 or higher, the resin composition was considered to have excellent coatability.

Components other than these are as described in the section "Raw materials".

INDUSTRIAL APPLICABILITY

According to the present invention, an epoxy resin composition having excellent curability and thermal stability; a prepreg; and a molded article, a fiber-reinforced composite material, and a structure, all of which have excellent flame retardancy and heat resistance and are obtained using the epoxy resin composition or the prepreg, can be provided.

Therefore, the present invention can be suitably utilized in order to obtain a fiber-reinforced composite material, and is industrially very important.

EXPLANATIONS OF LETTERS OR NUMERALS

1 HEAT FLOW CURVE
2 BASELINE
3 TEMPERATURE CURVE
t0 INITIATION POINT FOR ISOTHERMAL RETENTION TIME
ts CURING REACTION INITIATION TIME
ti TIME IN THE MIDDLE OF CURING

TABLE 11

|  |  | Example 4 | Comparative Example 9 | Comparative Example 10 |
|---|---|---|---|---|
| Component (A) [parts by mass] | Exolit OP935 | 9 | 0 | 0 |
| Component (B) [parts by mass] | jER828 | 60 | 25 | 25 |
|  | Epon165 | 40 | 0 | 0 |
|  | TX-0911 | 0 | 40 | 40 |
|  | jER152 | 0 | 35 | 35 |
| Component (C) [parts by mass] | DICY15 | 8 | 8 | 8 |
| Component (D) [parts by mass] | Omicure94 | 8 | 8 | 8 |
| Component (E) [parts by mass] | PN-50 | 5 | 5 | 0 |
|  | TIC-188 | 0 | 0 | 4.2 |
| Component (F) [parts by mass] | YP-70 | 0 | 11.1 | 11.1 |
| Other flame retardant [parts by mass] | FX-289FA | 0 | 41.3 | 41.3 |
| Phosphorus atom content [mass %] |  | 1.59 | 1.76 | 1.77 |
| Active hydrogen equivalent ratio |  | 0.75 | 1.01 | 1.01 |
| Urea equivalent ratio |  | 0.10 | 0.13 | 0.13 |
| Shear rate sweep | 500 (1/sec) | 7.29 | 37.48 | 43.56 |
|  | 1000 (1/sec) | 6.54 | 19.61 | 23.37 |
|  | Coefficient of determination | 0.99 | 0.96 | 0.95 |

The components in the table are as follows.

TX-0911: Liquid phenol novolac type epoxy resin, epoxy equivalent 172 g/eq, "TX-0911" manufactured by NIPPON STEEL & SUMIKIN CHEMICAL CO., LTD.

jER152: Liquid phenol novolac type epoxy resin, epoxy equivalent 177 g/eq, "jER152" manufactured by Mitsubishi Chemical Corporation FX-289FA: Phosphorus-containing epoxy resin, phosphorus atom content 7.4% by mass, "FX-289FA" manufactured by NIPPON STEEL & SUMIKIN CHEMICAL CO., LTD.

te CURING REACTION COMPLETION TIME
ΔHi CALORIFIC VALUE UNTIL TIME ti
ΔHtotal TOTAL CALORIFIC VALUE

The invention claimed is:
1. An epoxy resin composition, comprising:
Component (A): an organic phosphinic acid metal salt;
Component (B): an epoxy resin;
Component (C): dicyandiamide or a derivative thereof;
Component (D): a curing accelerator having a dimethylureido group; and

Component (E): at least one selected from the group consisting of an imidazole adduct, an imidazole clathrate compound, an imidazole compound coordinated with a stabilizer, and an imidazole compound per se, which has a curing initiation temperature of 100° C. or higher as measured by a method comprising:

preparing a sample resin composition by mixing 10 parts by mass of at least one selected from the group consisting of an imidazole adduct, an imidazole clathrate compound, an imidazole compound coordinated with a stabilizer, and an imidazole compound per se with 100 parts by mass of a bisphenol A type epoxy resin having an epoxy equivalent of 180 to 220;

measuring a calorific value of the sample resin composition using a differential scanning calorimeter at a rate of temperature increase of 10° C./min, and designating a temperature at the intersection point of the tangent line at the inflection point of the DSC curve thus obtained and the baseline as the curing initiation temperature, wherein the epoxy resin composition comprises the Component (A) in an amount such that a phosphorus atom content becomes 0.3% to 5.0% by mass in 100% by mass of the epoxy resin composition, with the proviso that in a case in which the epoxy resin composition comprises a metal hydroxide, 100% by mass of the epoxy resin composition excluding the metal hydroxide, and wherein the epoxy resin composition has an index of determination in shear rate sweep measurement of 0.98 or more.

2. The epoxy resin composition according to claim 1, wherein the Component (D) is at least one compound selected from the group consisting of phenyldimethylurea, methylenebis(phenyldimethylurea), and tolylenebis(dimethylurea).

3. The epoxy resin composition according to claim 1, wherein the epoxy resin composition comprises the Component (C) in an amount of 1 to 15 parts by mass, the Component (D) in an amount of 1 to 30 parts by mass, and the Component (E) in an amount of 1 to 30 parts by mass, with respect to 100 parts by mass of the Component (B).

4. The epoxy resin composition according to claim 1, further comprising:

Component (G): a metal hydroxide.

5. The epoxy resin composition according to claim 4, wherein the epoxy resin composition comprises the Component (G) in an amount of 70% by mass or less in 100% by mass of the epoxy resin composition, and when the phosphorus atom content in 100% by mass of the epoxy resin composition excluding the Component (G) is designated as x, and the content of the Component (G) in 100% by mass of the epoxy resin composition comprising the Component (G) is designated as y, satisfying the following Expression (1):

$$y \geq -4.5x + 39.8 \qquad (1).$$

6. The epoxy resin composition according to claim 1, wherein the Component (B) comprises a bisphenol F type epoxy resin.

7. The epoxy resin composition according to claim 1, wherein the Component (B) comprises a trifunctional or higher-functional epoxy resin having an epoxy equivalent of 350 or less.

8. The epoxy resin composition according to claim 1, further comprising:

Component (F): a thermoplastic resin.

9. The epoxy resin composition according to claim 8, wherein the Component (F) is at least one selected from the group consisting of a phenoxy resin and a polyvinylformal resin.

10. A molded article, obtained by molding the epoxy resin composition according to claim 1.

11. A prepreg, obtained by impregnating a reinforcing fiber bundle with the epoxy resin composition according to claim 1.

12. A fiber-reinforced composite material, obtained by curing the prepreg according to claim 11.

13. A structure having a portion or the entirety thereof constructed from the fiber-reinforced composite material according to claim 12.

14. The structure according to claim 13, wherein the structure comprises at least two pieces of the fiber-reinforced composite material, and a core material comprising at least one material selected from hollow glass microspheres and foamed plastic beads, the core material being sandwiched between the pieces of the fiber-reinforced composite material such that the at least two pieces of the fiber-reinforced composite material and the core material are integrated together.

15. The epoxy resin composition according to claim 1, wherein the epoxy resin composition comprises the Component (C) in an amount of 2 to 14 parts by mass, the Component (D) in an amount of 1 to 30 parts by mass, and the Component (E) in an amount of 2 to 25 parts by mass, with respect to 100 parts by mass of the Component (B).

* * * * *